US010614944B2

(12) United States Patent
Eom et al.

(10) Patent No.: US 10,614,944 B2
(45) Date of Patent: Apr. 7, 2020

(54) TRANSFORMER AND POWER SUPPLY DEVICE INCLUDING THE SAME

(71) Applicant: SOLUM CO., LTD., Yongin-si (KR)

(72) Inventors: Jae Gen Eom, Suwon-Si (KR); Young Seung Noh, Suwon-Si (KR); Heung Gyoon Choi, Suwon-Si (KR); Geun Young Park, Suwon-Si (KR); Sung Yun Han, Suwon-si (KR); Seh Hoon Jang, Suwon-si (KR); Nak Jun Jeong, Suwon-si (KR); Young Min Lee, Suwon-si (KR); Jong Woo Kim, Suwon-si (KR); Tae Won Heo, Suwon-si (KR)

(73) Assignee: SOLUM CO., LTD., Yongin-si (KR)

(*) Notice: Subject to any disclaimer, the term of this patent is extended or adjusted under 35 U.S.C. 154(b) by 0 days.

(21) Appl. No.: 16/390,984

(22) Filed: Apr. 22, 2019

(65) Prior Publication Data

US 2019/0252107 A1    Aug. 15, 2019

Related U.S. Application Data

(63) Continuation of application No. 14/329,258, filed on Jul. 11, 2014, now Pat. No. 10,312,012.

(30) Foreign Application Priority Data

Aug. 29, 2013  (KR) .................. 10-2013-0103456
Oct. 31, 2013   (KR) .................. 10-2013-0130785
Apr. 1, 2014    (KR) .................. 10-2014-0038862

(51) Int. Cl.
    *H01F 5/00*      (2006.01)
    *H01F 27/24*     (2006.01)
    (Continued)

(52) U.S. Cl.
    CPC ............. *H01F 27/24* (2013.01); *H01F 27/02* (2013.01); *H01F 27/06* (2013.01);
    (Continued)

(58) Field of Classification Search
    USPC ......................................... 336/200
    See application file for complete search history.

(56) References Cited

U.S. PATENT DOCUMENTS 5,239,425 A * 8/1993 Kazama ............ G11B 11/10534
                                                    360/59
5,781,074 A    7/1998 Leitch
(Continued)

FOREIGN PATENT DOCUMENTS

CN    1339803    3/2002
CN    1383569    12/2002
(Continued)

OTHER PUBLICATIONS

Notice of Office Action Korean Patent Application No. 10-2014-0067030 dated Jul. 3, 2014 with English translation.
(Continued)

*Primary Examiner* — Ronald Hinson

(57) ABSTRACT

A transformer includes a magnetic core, a first coil unit and a second coil unit. The first coil unit is disposed within the magnetic core and includes a laminated board having layers laminated therein and conductive patterns. Respective ones of the conductive patterns are disposed on the laminated layers. The second coil unit includes a conductive wire spaced apart from the conductive patterns of the laminated board by an insulating distance. The conductive wire includes a triple-insulated wire surrounded by three sheets of insulating paper to maintain the insulating distance from the conductive patterns.

6 Claims, 26 Drawing Sheets

(51) Int. Cl.
  *H01F 27/28* (2006.01)
  *H01F 27/06* (2006.01)
  *H01F 27/32* (2006.01)
  *H01F 27/02* (2006.01)

(52) U.S. Cl.
  CPC ..... *H01F 27/2804* (2013.01); *H01F 27/2823* (2013.01); *H01F 27/2828* (2013.01); *H01F 27/2847* (2013.01); *H01F 27/2885* (2013.01); *H01F 27/32* (2013.01); *H01F 27/323* (2013.01); *H01F 27/324* (2013.01); *H01F 27/327* (2013.01); *H01F 2027/065* (2013.01); *H01F 2027/2809* (2013.01); *H01F 2027/2819* (2013.01)

(56) References Cited

U.S. PATENT DOCUMENTS

| | | | |
|---|---|---|---|
| 5,781,077 | A | 7/1998 | Leitch et al. |
| 5,929,734 | A * | 7/1999 | Weiner ................ H01F 5/02 336/192 |
| 5,929,739 | A | 7/1999 | Totsuka |
| 6,114,934 | A | 9/2000 | Ikeda et al. |
| 6,529,389 | B2 | 3/2003 | Perlick et al. |
| 6,577,027 | B2 | 6/2003 | Hayase et al. |
| 6,914,508 | B2 | 7/2005 | Ferencz et al. |
| 6,980,076 | B1 | 12/2005 | Rolling et al. |
| 7,714,687 | B2 | 5/2010 | Marui et al. |
| 7,903,432 | B2 | 3/2011 | Luo et al. |
| 7,948,348 | B2 | 5/2011 | Silva |
| 7,987,581 | B2 | 8/2011 | Silva |
| 3,031,042 | A1 | 10/2011 | Silva |
| 8,089,331 | B2 | 1/2012 | Jacobson et al. |
| 8,136,411 | B2 | 3/2012 | Straub, Jr. et al. |
| 8,164,408 | B2 | 4/2012 | Kim |
| 8,310,327 | B2 | 11/2012 | Willers |
| 8,441,331 | B2 | 5/2013 | Maple |
| 8,510,133 | B2 | 10/2013 | Matsuda et al. |
| 8,593,245 | B2 | 11/2013 | Zeng et al. |
| 8,698,586 | B2 | 4/2014 | Park et al. |
| 8,928,449 | B2 * | 1/2015 | Silva ................ H01F 3/10 336/200 |
| 8,954,410 | B2 | 2/2015 | Chang et al. |
| 8,975,523 | B2 | 3/2015 | Silva |
| 2002/0024262 | A1 | 2/2002 | Hayase |
| 2002/0075120 | A1 * | 6/2002 | Yeh ................ H01F 27/2804 336/223 |
| 2002/0159214 | A1 | 10/2002 | Perlick et al. |
| 2004/0113739 | A1 | 6/2004 | Du et al. |
| 2005/0212640 | A1 * | 9/2005 | Chiang ............ H01F 27/2804 336/200 |
| 2007/0171022 | A1 | 7/2007 | Marui et al. |
| 2008/0253149 | A1 | 10/2008 | Matumoto |
| 2009/0295524 | A1 | 12/2009 | Silva |
| 2009/0295527 | A1 | 12/2009 | Silva |
| 2009/0295528 | A1 | 12/2009 | Silva et al. |
| 2009/0295529 | A1 | 12/2009 | Silva |
| 2009/0295531 | A1 | 12/2009 | Silva |
| 2010/0265023 | A1 | 10/2010 | Bertilsson |
| 2010/0301981 | A1 | 12/2010 | Zeng et al. |
| 2010/0301985 | A1 | 12/2010 | Luo et al. |
| 2011/0037405 | A1 | 2/2011 | Suganuma et al. |
| 2012/0002387 | A1 | 1/2012 | Park et al. |
| 2012/0038448 | A1 | 2/2012 | Kim et al. |
| 2012/0161913 | A1 | 6/2012 | Yen |
| 2012/0320505 | A1 | 12/2012 | Lee et al. |
| 2012/0326829 | A1 * | 12/2012 | Matsuda ............ H01F 27/2823 336/212 |
| 2013/0278374 | A1 | 10/2013 | Thorslund |
| 2014/0139313 | A1 | 5/2014 | Zhou et al. |
| 2015/0061805 | A1 | 3/2015 | Eom et al. |
| 2015/0130574 | A1 | 5/2015 | Eom et al. |
| 2015/0130575 | A1 | 5/2015 | Eom et al. |
| 2015/0130578 | A1 | 5/2015 | Eom et al. |

FOREIGN PATENT DOCUMENTS

| | | |
|---|---|---|
| CN | 1930644 | 3/2007 |
| CN | 101651008 | 2/2010 |
| CN | 101902140 | 12/2010 |
| CN | 102782780 | 11/2012 |
| CN | 204088041 | 1/2015 |
| JP | 3437428 B2 | 8/2008 |
| JP | 4162037 B2 | 10/2008 |
| JP | 2012-15525 A | 1/2012 |
| JP | 2012-038941 A | 2/2012 |
| KR | 10-2011-0005742 | 1/2011 |
| KR | 20-2011-0001771 U | 2/2011 |
| KR | 10-2012-0015814 A | 2/2012 |
| KR | 10-2012-0025441 | 3/2012 |
| KR | 10-2012-0028117 | 3/2012 |
| KR | 10-2013-0008655 | 1/2013 |
| TW | 201042674 | 12/2010 |
| TW | 201227764 | 7/2012 |
| WO | 2008/074767 | 6/2008 |
| WO | 2009131059 A1 | 10/2009 |
| WO | 2012/036371 | 3/2012 |

OTHER PUBLICATIONS

Notice of Office Action Korean Patent Application No. 10-2014-0066868 dated Jul. 3, 2014 with English translation.
Notice of Office Action Korean Patent Application No. 10-2014-0067029 dated Jul. 3, 2014 with English translation.
Notice of Office Action Korean Patent Application No. 10-2014-0181848 dated Jan. 9, 2015 with full English translation.
Non-Final Office Action U.S. Appl. No. 14/600,866 dated Nov. 6, 2015.
Non-Final Office Action U.S. Appl. No. 14/601,718 dated Nov. 6, 2015.
Non-Final Office Action U.S. Appl. No. 14/603,056 dated Dec. 3, 2015.
Final Office Action dated Mar. 31, 2016, issued in U.S. Appl. No. 14/600,866.
Final Office Action dated Mar. 24, 2016, issued in U.S. Appl. No. 14/601,718.
Final Office Action dated Apr. 6, 2016, issued in U.S. Appl. No. 14/603,056.
Non-Final Office Action U.S. Appl. No. 14/603,056 dated Aug. 25, 2016.
Non-Final Office Action U.S. Appl. No. 14/600,866 dated Sep. 9, 2016.
Non-Final Office Action U.S. Appl. No. 14/601,718 dated Sep. 9, 2016.
Final Office Action U.S. Appl. No. 14/601,718 dated Mar. 2, 2017.
Final Office Action U.S. Appl. No. 14/600,866 dated Feb. 9, 2017.
First Office Action issued in corresponding Chinese Patent Application No. 201410356723.5, dated May 27, 2017; with English translation.
Decision to Patent Grant Korean Patent Application No. 10-2014-0067029, dated Oct. 7, 2014 (with full English translation).
Notice of Office Action Korean Patent Application No. 10-2014-0067029, dated Jul. 3, 2014 (with full English translation).
Decision to Patent Grant Korean Patent Application No. 10-2014-0066868, dated Oct. 24, 2014, (with full English translation).
Decision to Patent Grant Korean Patent Application No. 10-2014-00670230, dated Oct. 7, 2014 (with full English translation).
Notice of Office Action in Korean Pal Appl No. 10-2014-0067030, dated Jul. 3, 2014 (with full English translation).
Office Action dated Mar. 6, 2017, issued in U.S. Appl. No. 14/603,056.
Office Action dated Jul. 28, 2017, issued in U.S. Appl. No. 14/603,056.
Office Action dated Aug. 24, 2017, issued in U.S. Appl. No. 141600,866.
Notice of Allowance dated Jun. 23, 2017, issued in U.S. Appl. No. 14/601,718.
Final Office Action issued in related U.S. Appl. No. 14/600,866, dated Jan. 24, 2018.

(56) References Cited

OTHER PUBLICATIONS

Chinese Office Action issued in corresponding Chinese Patent Application No. 201410356723.5, dated Feb. 5, 2018, with English Translation.
The handbook for electrical Engineer, Apr. 30, 2008, chiefly edited by Heliang Zhou, Beijing: China Electric Power.
Communication of Chinese Patent Application No. 201410356723.5 dated Sep. 5, 2018.
Communication of Korean Office Action of Patent Application No. 10-2015-0031814 dated Apr. 2, 2019.

* cited by examiner

TRANSFORMER AND POWER SUPPLY DEVICE INCLUDING THE SAME

CROSS-REFERENCE TO RELATED APPLICATION

This application is a Continuation Application of U.S. application Ser. No. 14/329,258 filed Jul. 11, 2014, which claims priority to, and benefit of Korean Patent Application No. 10-2013-0103456 filed on Aug. 29, 2013, Korean Patent Application No. 10-2013-0130785 filed on Oct. 31, 2013, and Korean Patent Application No. 10-2014-0038862 filed on Apr. 1, 2014 with the Korean Intellectual Property Office. The subject matter of each is hereby incorporated by reference in entirety.

TECHNICAL FIELD

The present disclosure relates to a transformer and a power supply device including the same.

BACKGROUND

A power supply device includes a power source unit, and a transformer disposed therein may have a size corresponding to nearly one-third of the volume of the entire power source unit.

A transformer includes a core, a bobbin, a winding, and the like. Even when a transformer includes a small amount of components, securing a space for a creepage distance required between windings and a core, winding insulating tapes on windings of a primary coil and a secondary coil to satisfy safety requirements, and the like, complicate a manufacturing process thereof.

Also, in the case of winding coils, coil turns or winding positions may not be equal or uniform, according to operators.

Thus, in order to miniaturize transformers and simplify manufacturing processes thereof, a method for developing a transformer provided with a new structure is required.

Patent document 1 discloses a transformer using a coil in a thin film substrate and a winding coil inserted into a magnetic pole portion of a core.

RELATED ART DOCUMENT (Patent Document 1) Japanese Patent Publication No. 3437428

SUMMARY

An aspect of the present disclosure may provide a miniaturized transformer including first and second coil units provided with enhanced insulating properties, and a power supply device including the transformer mounted thereon.

One aspect of the present disclosure relates to a transformer may including a magnetic core, a first coil unit and a second coil unit. The first coil unit is disposed within the magnetic core and includes a laminated board having a plurality of first layers laminated therein. Respective conductive patterns are disposed on the first layers. The second coil unit includes a conductive wire disposed at an insulating distance from the conductive pattern of the laminated board. The insulating distance is secured by an insulating layer coupled to at least one of the first coil unit and the second coil unit.

The plurality of first layers may be laminated to form an inductor pattern in a lamination direction, and the laminated board may further include at least one of a second layer on which a shielding pattern is disposed and a third layer on which a Vcc pattern is disposed to form an induction current.

The second layer may be disposed above or below the inductor pattern in the lamination direction.

The third layer may be disposed between an upper portion of the inductor pattern in the lamination direction and the second layer.

The third layer may be disposed between a lower portion of the inductor pattern in the lamination direction and the second layer.

A dummy pattern layer may be disposed above or below the first layers in the lamination direction, and the dummy pattern layer may include at least two dummy pattern layers successively laminated.

The conductive wire may be surrounded by at least two sheets of insulating paper.

The conductive wire may be a triple-insulated wire surrounded by three sheets of insulating paper, and a thickness of the triple-insulated wire may be smaller than a thickness of the laminated board.

A distance from the conductive wire of the second coil unit to a conductive pattern of the first layer directly adjacent to the conductive wire may be smaller than 0.4 mm.

The magnetic core may include a first core unit having a middle leg and an outer leg. The middle leg may be disposed in a core insertion hole defined in the first coil unit and a second core unit. Wound conductive wires may be interposed between the middle leg and the outer leg.

The second core unit may have a rail groove maintaining a space between the wound conductive wires.

The second core unit may have a lead-out recess defined in an inner side thereof in order for a lead-out portion of the conductive wire not to overlap.

The lead-out recess may be provided with a width corresponding to the lead-out portion of the conductive wire.

The lead-out recess may be provided with a width sufficient for allowing the lead-out portion to move in the lead-out recess.

The conductive wire may be led out from one open side of an outer leg of the second core unit.

A side opposing the open one side of the outer leg of the second core unit may be closed.

The first coil unit may include a connector. The connector may include a terminal and a stoppage protrusion such that an insertion depth of the connector is determined by the terminal and the stoppage protrusion.

The transformer may further include a spacer disposed between an inner surface of the magnetic core and the first coil unit and allowing the second coil unit to be in contact with the first coil unit and an other portion of the inner surface of the magnetic core.

The spacer may include a buffering material formed of rubber.

The spacer may include a conductive material.

Another aspect of the present disclosure encompasses a transformer including a magnetic core, a first coil unit and a second coil unit. The first coil unit is disposed within the magnetic core and includes a laminated board having first layers laminated therein. Respective conductive patterns are disposed on the first layers. The second coil unit includes a conductive wire disposed at an insulating distance from the conductive pattern of the laminated board. The insulating distance is secured by an insulating sheet disposed between the first coil unit and the second coil unit.

At least two or more insulating sheets may be laminated between the first coil unit and the second coil unit.

A distance from a center of the conductive wire of the second coil to a conductive pattern of the first layer directly adjacent to the conductive wire may be smaller than 0.4 mm.

Still another aspect of the present disclosure relates to a transformer including a magnetic core, a first coil unit and a second coil unit. The first coil unit includes a first conductive wire wound and disposed within the magnetic core. The second coil unit includes a second conductive wire disposed at an insulating distance from the first conductive wire. The insulating distance is secured by an insulating sheet disposed between the first coil unit and the second coil unit.

The magnetic core may include a first core unit in which the first coil unit is disposed and a second core unit in which the conductive wire is disposed, and the insulating sheet may separate the first core unit and the second core unit.

Two or more insulating sheets may be laminated between the first coil unit and the second coil unit.

A minimum distance between the first conductive wire and the second conductive wire disposed with the insulating sheet interposed therebetween may be less than or equal to 0.4 mm.

Still another aspect of the present disclosure encompasses a transformer including a magnetic core, a first coil unit and a second coil unit. The first coil unit is disposed within the magnetic core and includes a first laminated board having layers laminated therein. First conductive patterns are respectively disposed on the laminated layers of the first laminated board. The second coil unit is disposed at an insulating distance from the first coil unit and includes a second laminated board having layers laminated therein. Second conductive patterns are respectively disposed on the laminated layers of the second laminated board.

The insulating distance may be secured by an insulating layer coupled to at least one of the first laminated board and the second laminated board.

A dummy pattern layer may be disposed between the first conductive pattern and the second conductive pattern on at least one of the first laminated board and the second laminated board, and the dummy pattern layer may include at least two dummy pattern layers successively laminated.

A minimum distance between the first conductive pattern and the second conductive pattern disposed with the dummy pattern layer interposed therebetween may be smaller than or equal to 0.4 mm.

The insulating distance may be secured by an insulating sheet disposed between the first laminated board and the second laminated board.

A minimum distance between the first conductive pattern and the second conductive pattern disposed with the insulating sheet interposed therebetween may be equal to or smaller than 0.4 mm.

Still another aspect of the present disclosure relates to a transformer including a magnetic core, a first coil unit and a second coil unit. The first coil unit is disposed within the magnetic core and includes a first laminated board having layers laminated therein. First conductive patterns are respectively disposed on the laminated layers of the first laminated board. The second coil unit is disposed at an insulating distance from the first coil unit and includes a second laminated board having layers laminated therein. Second conductive patterns are respectively disposed on the laminated layers of the second laminated board. The first laminated board and the second laminated board are formed as a single board.

The insulating distance may be secured by an insulating layer disposed between the first coil unit and the second coil unit.

A minimum distance between the first conductive pattern and the second conductive pattern disposed with the insulating layer interposed therebetween may be smaller than or equal to 0.4 mm.

Still another aspect of the present disclosure encompasses a power supply device including a transformer and a main board. The transformer secures an insulating distance by two or more insulating layers and includes a magnetic core in which a laminated board including first layers, conductive patterns being respectively disposed on the first layers. The transformer is disposed on the main board. An electrode pad disposed on the laminated board is led out to an external surface of the magnetic core and the electrode pad is coupled with an electrode of the main board by soldering such that the laminated board is disposed to parallel with the main board.

Still another aspect of the present disclosure relates to a power supply device including a transformer, a connector and a main board. The transformer secures an insulating distance by two or more insulating layers and includes a magnetic core in which a laminated board including first layers, conductive patterns being respectively disposed on the first layers. The connector has a terminal disposed on one side of the laminated board led out to an external surface of the magnetic core. The transformer is disposed on the main board. The connector is insertedly coupled to a slot defined in the main board such that the laminated board is disposed to be perpendicular to the main board.

Still another aspect of the present disclosure encompasses a transformer including a magnetic core, a first coil unit, a second coil unit and an insulating layer. The first coil unit is disposed within the magnetic core and includes a first laminated board having layers laminated therein. First conductive patterns are respectively disposed on the laminated layers of the first laminated board. The second coil unit is disposed at an insulating distance from the first coil unit and includes a second laminated board having layers laminated therein. Second conductive patterns are respectively disposed on the laminated layers of the second laminated board. The insulating layer is disposed between the first coil unit and the second coil unit and has an insulating pattern defined thereon.

BRIEF DESCRIPTION OF DRAWINGS

The above and other aspects, features and other advantages of the present disclosure will be more clearly understood from the following detailed description taken in conjunction with the accompanying drawings, in which like reference characters may refer to the same or similar parts throughout the different views. The drawings are not necessarily to scale, emphasis instead being placed upon illustrating the principles of the embodiments of the present inventive concept. In the drawings, the thickness of layers and regions may be exaggerated for clarity.

DETAILED DESCRIPTION

Figure 1:
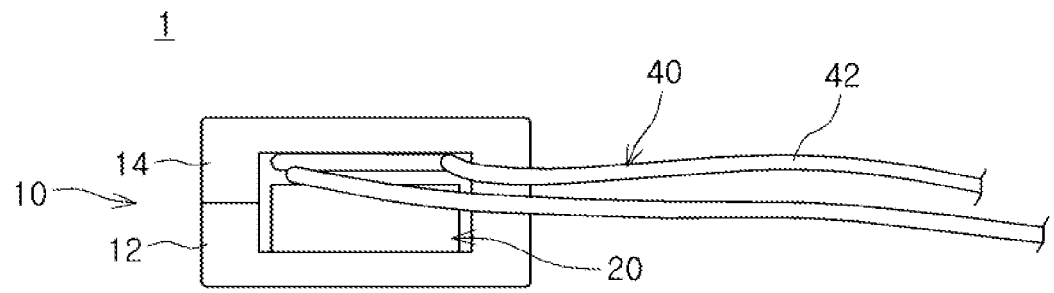
FIG. 1 is a view schematically illustrating a transformer according to a first exemplary embodiment of the present inventive concept.

Hereinafter, exemplary embodiments of the present inventive concept will be described in detail with reference to the accompanying drawings.

The disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

Transformer

Figure 2:
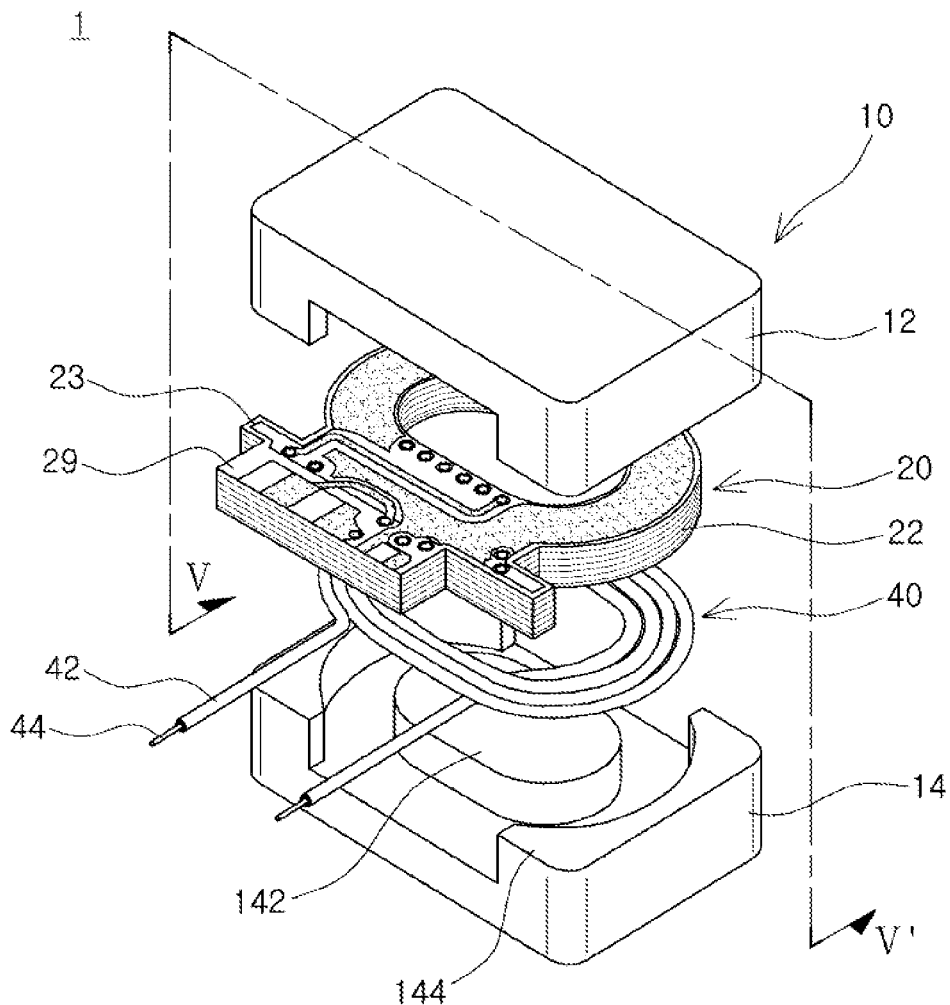
FIG. 2 is a perspective view schematically illustrating the transformer according to the first exemplary embodiment of the present inventive concept.
Figure 3:
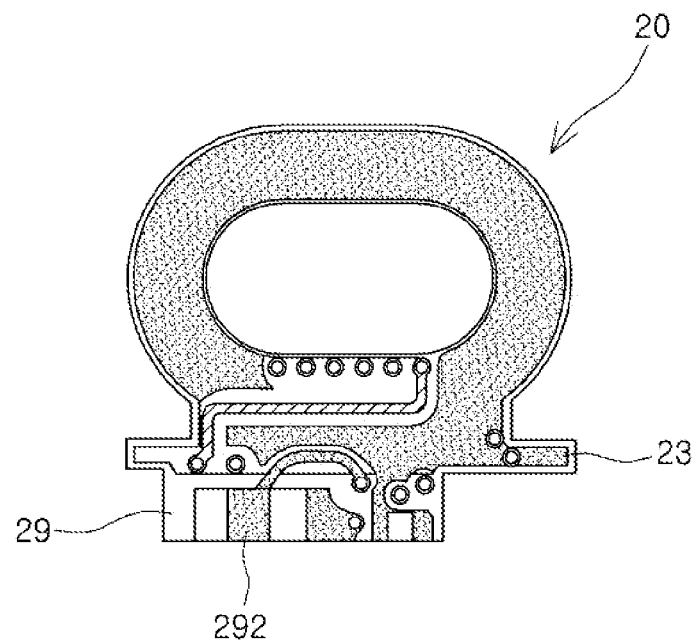
FIG. 3 is a plan view of a first coil unit according to the first exemplary embodiment of the present inventive concept.
Figure 4:
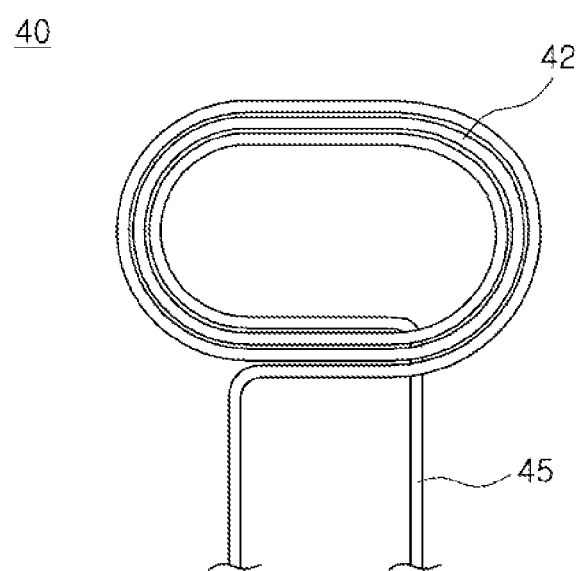
FIG. 4 is a plan view of a second coil unit according to the first exemplary embodiment of the present inventive concept.

FIG. 1 is a view schematically illustrating a transformer according to a first exemplary embodiment of the present inventive concept, FIG. 2 is a perspective view schematically illustrating the transformer according to the first exemplary embodiment of the present inventive concept, FIG. 3 is a plan view of a first coil unit according to the first exemplary embodiment of the present inventive concept, and FIG. 4 is a plan view of a second coil unit according to the first exemplary embodiment of the present inventive concept.

Figure 5:
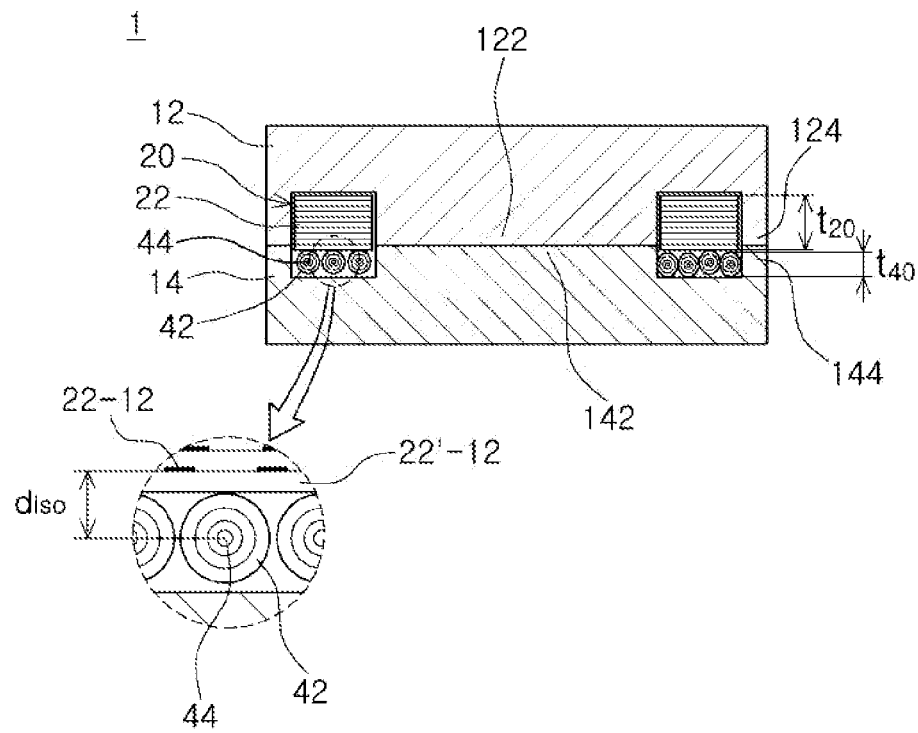
FIG. 5 is a cross-sectional view taken along line V-V' of FIG. 2.
Figure 6:
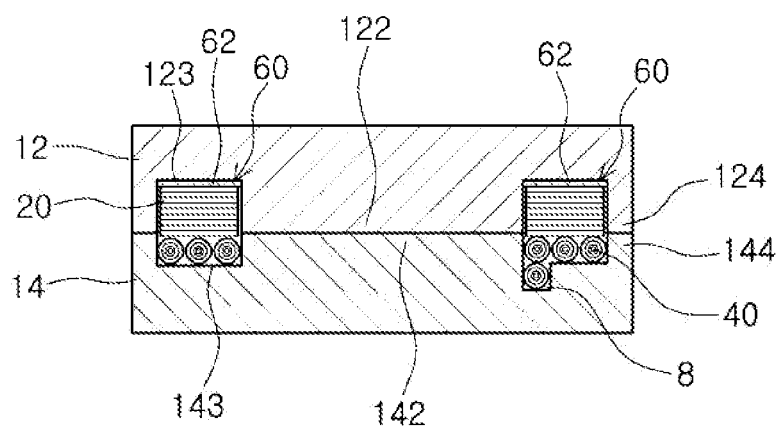
FIG. 6 is a cross-sectional view illustrating a modified example taken along line V-V' of FIG. 2.
Figure 7:
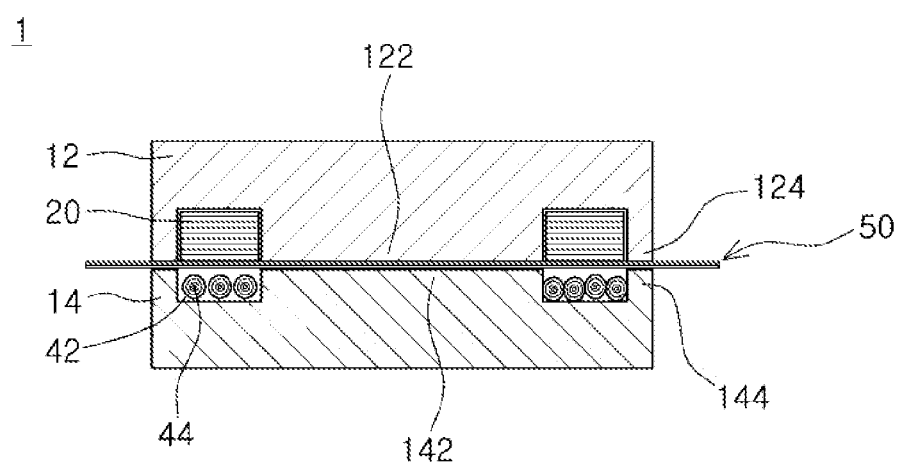
FIG. 7 is a cross-sectional view illustrating another modified example taken along line V-V' of FIG. 2.

FIG. 5 is a cross-sectional view taken along line V-V' of FIG. 2, FIG. 6 is a cross-sectional view illustrating a modified example taken along line V-V' of FIG. 2, and FIG. 7 is a cross-sectional view illustrating another modified example taken along line V-V' of FIG. 2.

Referring to FIGS. 1 through 7, a transformer 1 according to a first exemplary embodiment of the present inventive concept may include a magnetic core 10, a first coil unit 20, and a second coil unit 40.

The magnetic core 10 may include a first core unit 12 having a space between a middle leg 122 and an outer leg 124 and a second core unit 14 provided with a middle leg 142 and an outer leg 144 corresponding to the first core unit 12.

While the magnetic core is illustrated as an E-type core having an E shape, the present inventive concept is not limited thereto. For example, the magnetic core 10 may be configured as an E-I-type magnetic core, an I-I-type magnetic core, or the like.

The first coil unit 20 may be a laminated board 22 including an inductor pattern in which a plurality of thin layers 22'-12 (see FIG. 5) on which a conductive pattern 22-12 is formed are laminated to have a predetermined number of turns. For example, each layer 22'-12 may be a thin polymer plastic board, but a material thereof is not particularly limited as long as it can have insulating properties.

In order to form the inductor pattern having a coil shape by connecting the conductive patterns 22-12 on the layers 22'-12, the conductive patterns 22-12 on upper and lower layers 22'-12 may be electrically connected through via electrodes formed on the layers 22'-12 or in any other contact manner.

Here, upper and lower positions may be interchanged. However, a portion of the first coil unit 20 adjacent to the second coil unit 40, may be defined as a lower portion, and a portion of the first coil unit 20 away from the second coil unit 40, may be defined as an upper portion. Also, at least one of the coil unit 20 and the second coil unit 40 may be mounted to be adjacent as needed in an adapter in which the transformer is mounted or on a main board of a power supply device, and a portion adjacent to the main board may be defined as a lower portion.

Configuration of the layers in the laminated board 22 will hereinafter be described in detail.

In an exemplary embodiment of the present inventive concept, the first coil unit 20 may be used as a primary coil. However, the present disclosure is not limited thereto and may be variously modified; namely, the second coil unit 40 described hereinafter may be used as a primary coil.

Referring to FIG. 5, the second coil unit 40 may be provided with a conductive wire 44 disposed at an insulation distance $d_{iso}$ from the conductive pattern 22-12. Here, the insulation distance $d_{iso}$ may be defined as a distance between the conductive wire 44 and the conductive pattern 22-12 formed on the layer 22-12' of the first coil unit constituting an inductor pattern closest to the second coil unit 40.

As the distance between the first coil unit 20 and the second coil unit 40 is reduced, leakage inductance may be reduced.

The conductive wire 44 of the second coil unit 40 may be surrounded with two or more sheets of insulating paper so as to be insulated. Also, the conductive wire 44 of the second coil unit 40 may be a triple-insulated wire 42 surrounded with three sheets of insulating paper, and a thickness t40 (see FIG. 5) of the triple-insulated wire may be smaller than a thickness t20 (see FIG. 5) of the laminated board 22.

The triple-insulated wire 42 may be disposed in a space between a middle leg 142 and an outer leg 144 of the second core unit 14, and may be wound based on the middle leg 142 as a center.

Conductors like the conductive wire 44 included in the first coil unit 20 and the second coil unit 40 may be disposed at an insulating distance therebetween to satisfy safety standards determined by Underwriters Laboratories (UL) safety standards.

According to the UL safety standards for a transformer, in case of using a sheet of insulating paper, a distance between the first coil unit 20 and the second coil unit 40 should be 0.4 mm or greater, and in case of using three or more sheets of insulating paper, the distance therebetween may be approximately 0.4 mm or smaller.

Since a number of turns of a conductive wire is determined by configuring the laminated board 22 of the first coil unit 20 to have approximately 2.6 mm, a thickness of the second coil unit 40 may be smaller than a thickness of the laminated board 22.

In this case, a distance from the conductive wire 44 of the second coil unit 40 to the conductive pattern 22-12 formed on the first layer 22'-12 directly adjacent to the conductive wire 44 may be designed to be smaller than 0.4 mm. Thus, the transformer may secure an insulating distance and be miniaturized.

Referring to FIG. 5, the triple-insulated wire 42 may be wound as a single layer such that wires do not overlap within the second core unit 14. When the triple-insulated wire 42 is formed by extending a single wire, a lead-out portion 45 (see FIG. 4) may overlap with other portions of the triple-insulated wire 42. In order to resolve this, as illustrated in FIG. 6, a lead-out recess 8 may be defined in the second core unit 14 to allow the lead-out portion 45 to be inserted thereinto.

Referring to FIG. 6, a spacer 60 may be provided between an inner surface 123 of the magnetic core 10 and the first coil unit 20. The spacer 60 may be a buffering material 62 formed of rubber, but the present disclosure is not limited thereto. Also, the spacer 60 may allow the triple-insulated wire 42 to be in contact or tightly contact with the first coil unit 20 and an inner surface 143 opposing the inner surface 123 of the magnetic core 10. Within the magnetic core 10, if a space between the first coil unit 20 and the second coil unit 40 may be uniform, it may makes to uniform the variations in leakage inductance that may be generated between the conductors when the transformer is manufactured.

The spacer 60 may be formed of an insulating material to enhance insulating properties of the transformer. Also, the spacer 60 may be formed of a conductive material to electrically connect the magnetic core 10 and the laminated board 22 to thereby reduce electromagnetic interference (EIM).

Meanwhile, the first coil unit 20 of the first laminated board 22 may include a connector 29 provided with a terminal 292 (see FIG. 3) electrically connected to an external board and a stoppage protrusion 23 determining an insertion depth of the connector 29.

The connector 29 and the stoppage protrusion 23 may facilitate electrical connection with an external board.

Referring to FIG. 7, an insulating distance between the first coil unit 20 and the second coil unit 40 may be secured by disposing an insulating sheet 50 between the first coil unit 20 and the second coil unit 40, rather than coupling an insulating layer to the first coil unit 20 or the second coil unit 40.

At least two or more insulating sheets 50 may be laminated. Also, in the exemplary embodiment of FIG. 7, as illustrated in FIG. 5, a distance from the center of the conductive wire 44 to the conductive pattern 22-12 formed on the directly adjacent first layer 22'-12 may be smaller than 0.4 mm.

Magnetic Core

Figure 8A:
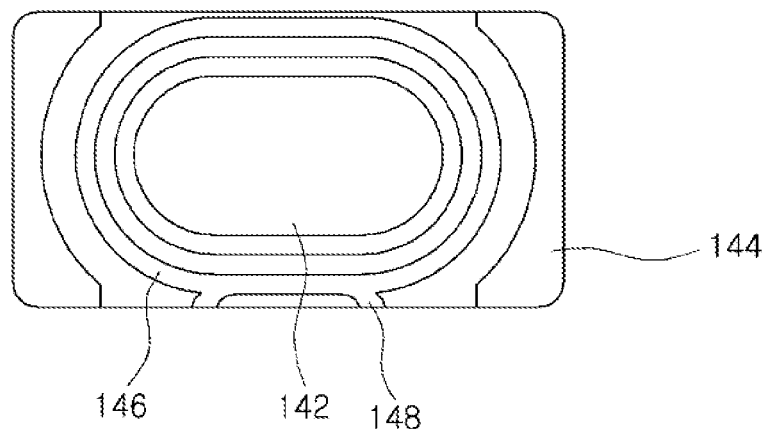
FIGS. 8A and 8B are a plan view and a perspective view of a first exemplary embodiment of a magnetic core of the present inventive concept.
Figure 8B:
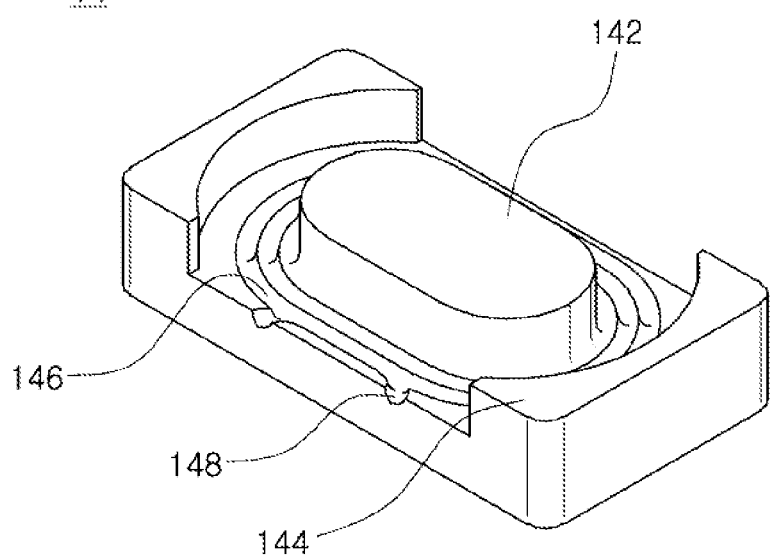
Figure 9A:
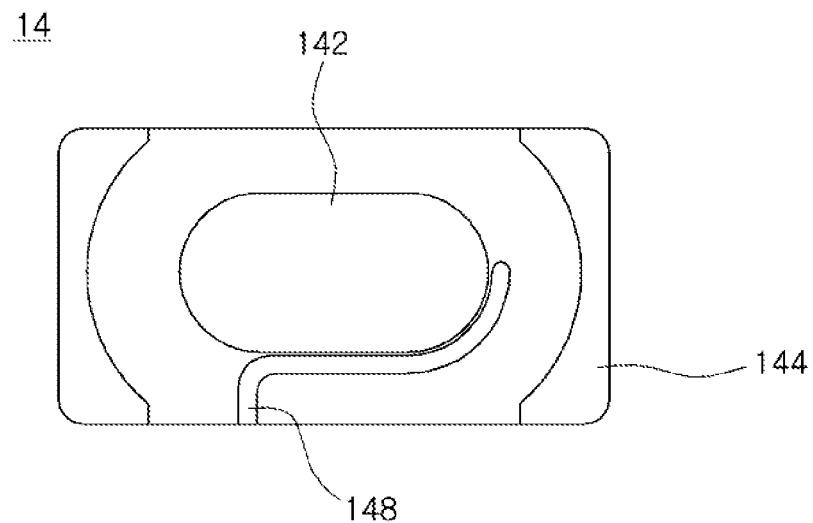
FIGS. 9A and 9B are a plan view and a perspective view of a second exemplary embodiment of a magnetic core of the present inventive concept.
Figure 9B:
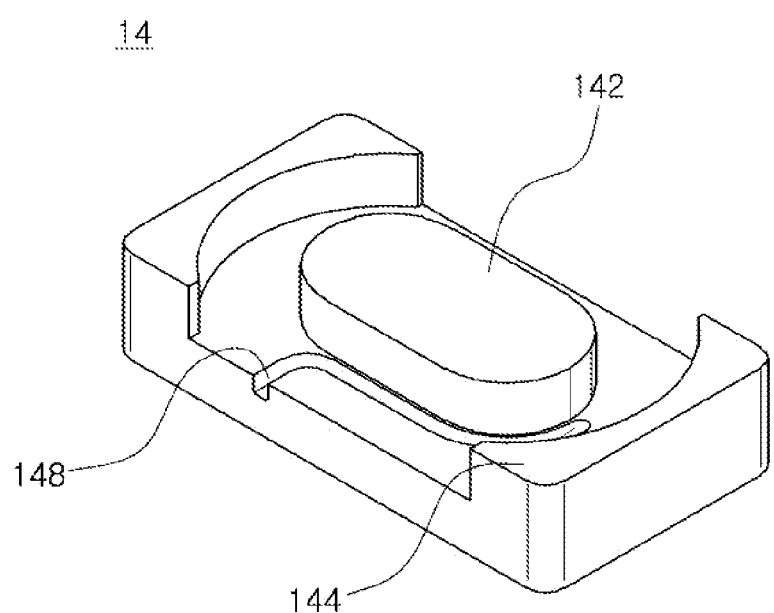
Figure 10A:
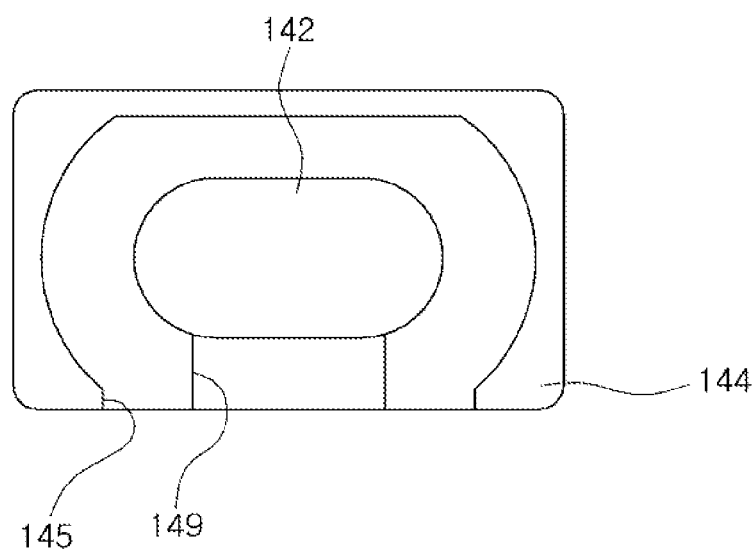
FIGS. 10A and 10B are a plan view and a perspective view of a third exemplary embodiment of a magnetic core of the present inventive concept.
Figure 10B:
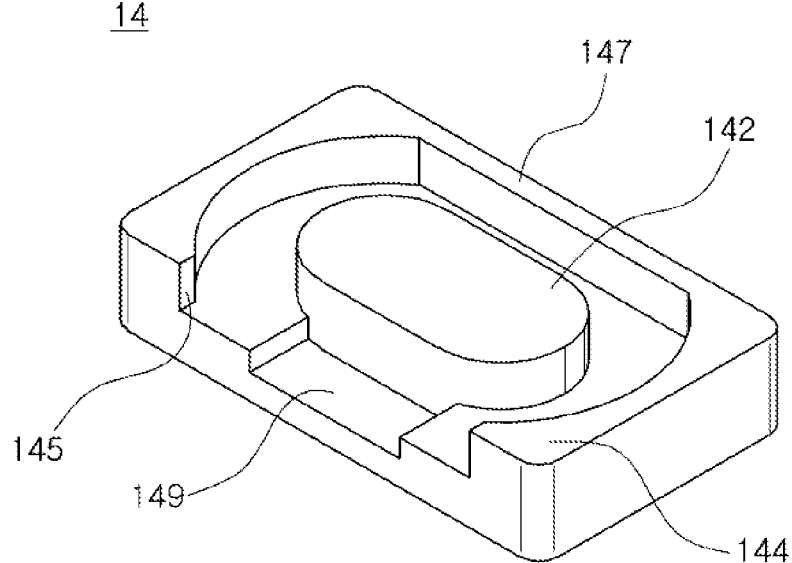

FIGS. 8A and 8B are respectively a plan view and a perspective view of a first exemplary embodiment of a magnetic core of the present inventive concept. FIGS. 9A and 9B are a plan view and a perspective view of a second exemplary embodiment of a magnetic core of the present inventive concept. FIGS. 10A and 10B are respectively a plan view and a perspective view of a third exemplary embodiment of a magnetic core of the present inventive concept.

Referring to FIGS. 8A and 8B, a rail groove 146 may be formed in the second core unit 14 in which a wire is wound. The rail groove 146 may maintain a space between wires and fix a winding position of the wire, reducing variations in leakage inductance generated between wires.

Referring to FIGS. 9A and 9B, a lead-out groove 148 may be formed in the second core unit 14 in which a wire is wound. As described above, since the wire is wound within the second core unit 14, overlapping occurs in the lead-out portion (e.g., 45 in FIG. 4) of the wire. Thus, by forming the lead-out groove 148 in the second core unit 14, overlapping in the lead-out portion may be prevented and uniform leakage inductance may be obtained. Also, resistance generated by the wire itself due to overlapping may also be reduced.

Here, the lead-out groove 148 may be formed within a range within one open side formed in the second core unit 14. As illustrated in the exemplary embodiment of FIGS. 9A and 9B, the lead-out groove 148 may have a width corresponding to the lead-out portion of the wire.

Referring to FIGS. 10A and 10B, a lead-out recess 149 formed in the second core unit 14 in which a wire is wound may have a width allowing the lead-out portion of the wire to be moved within the lead-out recess 149.

As illustrated in FIGS. 10A and 10B, the lead-out recess 149 may be smaller than a width of the middle leg 142 such that a gap range allowing the wire to be moved may be adjusted.

Meanwhile, referring to FIGS. 10A and 10B, one side 145 of the outer leg 144 of the second core unit 14 may be open, and the other side 147 thereof may be closed. With this configuration, an area of the outer leg 144 may be increased and the second core unit 14 may surround a large portion of the winding of the wire, thereby increasing an EMI shielding effect.

Figure 11:
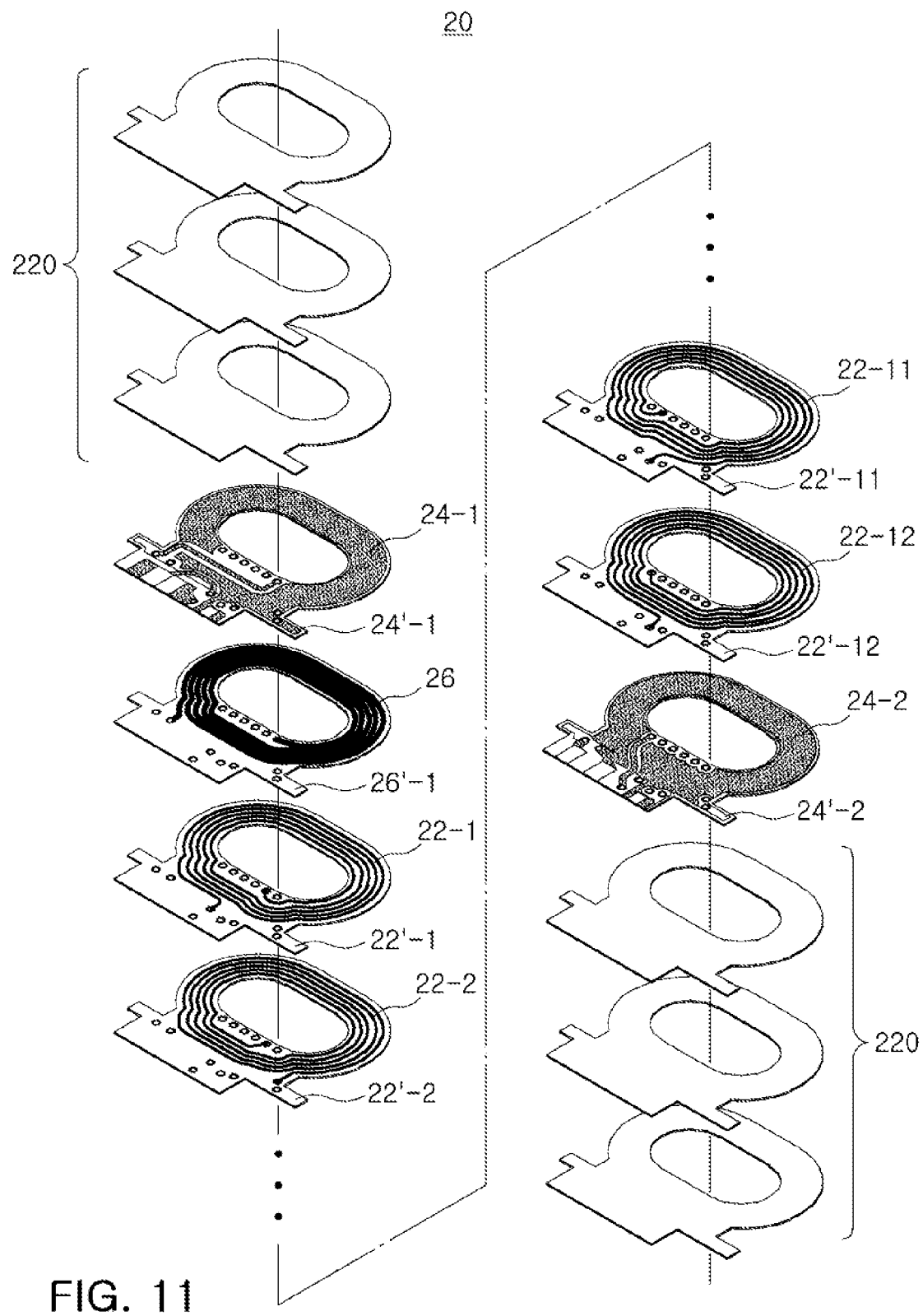
FIG. 11 is a perspective view schematically illustrating a first exemplary embodiment of laminating layers of a first coil unit.
Figure 12:
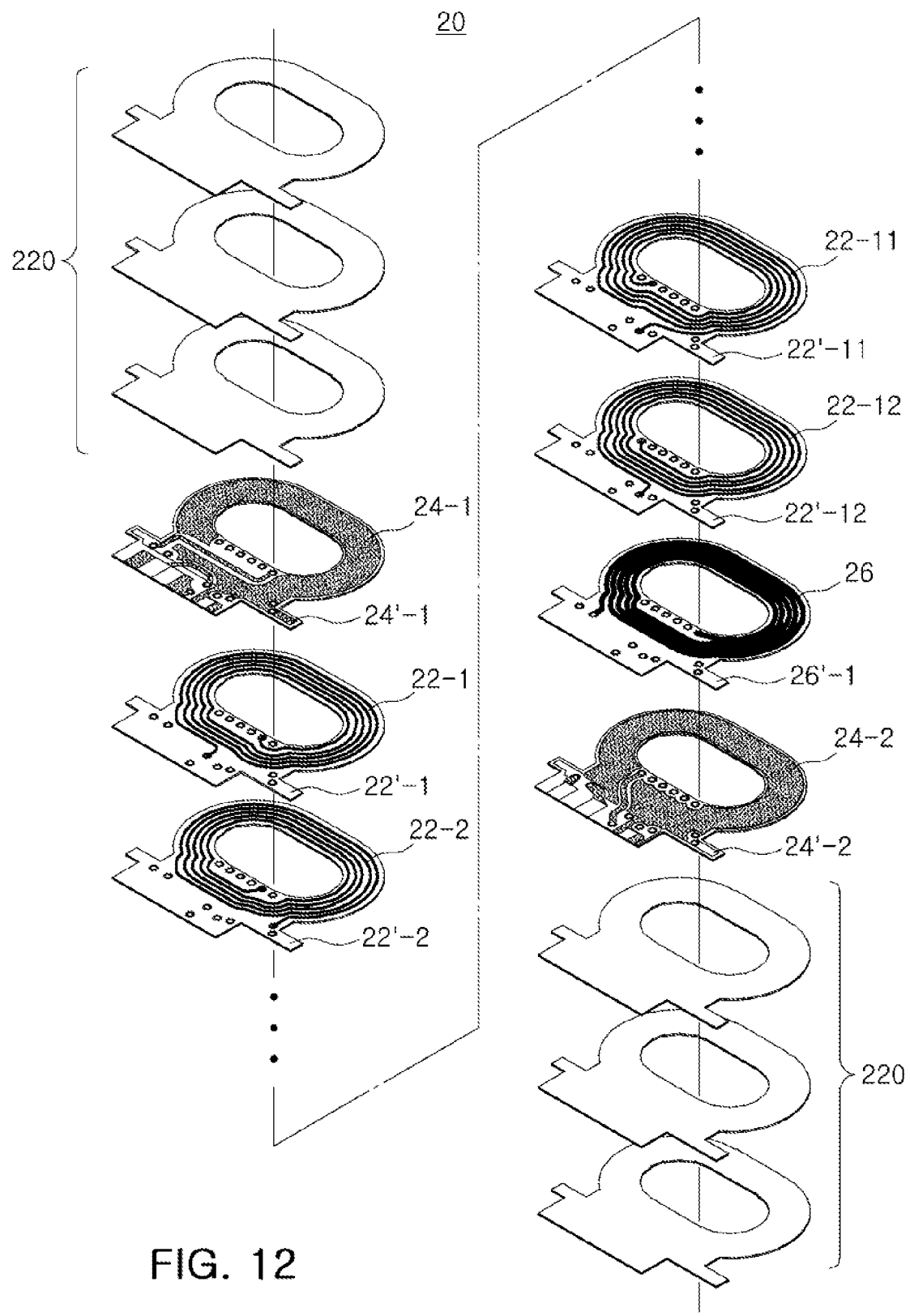
FIG. 12 is a perspective view schematically illustrating a second exemplary embodiment of laminated layers of a first coil unit of the present inventive concept.

FIG. 11 is a perspective view schematically illustrating a first exemplary embodiment of laminating layers of a first coil unit of the present inventive concept, and FIG. 12 is a perspective view schematically illustrating a second exemplary embodiment of the laminated layers of a first coil unit of the present inventive concept.

Referring to FIGS. 11 and 12, the first coil unit 20 may include first layers 22'-1, 22'-2, . . . , 22'-12 on which conductive patterns 22-1, 22-2, . . . , 22-12 are formed, respectively, second layers 24'-1 and 24'-2 on which shielding patterns 24-1 and 24-2 are formed, respectively, and a third layer 26-1 on which a Vcc pattern 26 is formed to form an induction current.

The first, second, and third layers may be laminated to form a laminated board, and each of the first, second, and third layers may be provided with a through hole allowing the idle leg of the magnetic core to be inserted thereinto.

Here, referring to the exemplary embodiment of FIGS. 11 and 12, the conductive patterns 22-1, 22-2, . . . , 22-12 formed on the first layers 22'-1, 22'-2, . . . , 22'-12 may be electrically connected using via electrodes, or the like, and may be laminated to form an inductor pattern having a coil shape. Also, the second layers 24'-1 and 24'-2 may be respectively formed above and below the first layers 22'-1, 22'-2, . . . , 22'-12 in a lamination direction.

Also, the first coil unit 20 may include one or more layers 220 with a dummy pattern disposed in at least one of the uppermost portion and lowermost portion of the laminated board 22 in order to increase insulating properties with respect to the second coil unit 40 or the magnetic core.

When three thin layers 220 with the dummy pattern are provided between the first coil unit 20 and the second coil unit 40, even in the case that a distance between the first coil unit 20 and the second coil unit 40 is within 0.04 mm, a safety insulating distance may be secured. Any other laminated board may be used as the second coil unit 40, and the first coil unit 20 and the second coil unit 40 may be formed with a single laminated board.

Meanwhile, unlike the exemplary embodiment of FIG. 11, in the exemplary embodiment of FIG. 12, the third layer 26'-1 having the Vcc pattern 26 disposed thereon may be disposed to be closer to the second coil unit 40. However, without being limited to the exemplary embodiments of FIGS. 11 and 12, the Vcc pattern 26 may be disposed above or below the shielding patterns 24-1 and 24-2 in the lamination direction or above or below the conductive patterns 22-1, 22-2, . . . , 22-12, or between the conductive patterns 22-1, 22-2, . . . , 22-12. Also, in laminating the shielding patterns 24-1 and 24-2, at least one of the shielding patterns 24-1 and 24-2 may be omitted.

Figure 13:
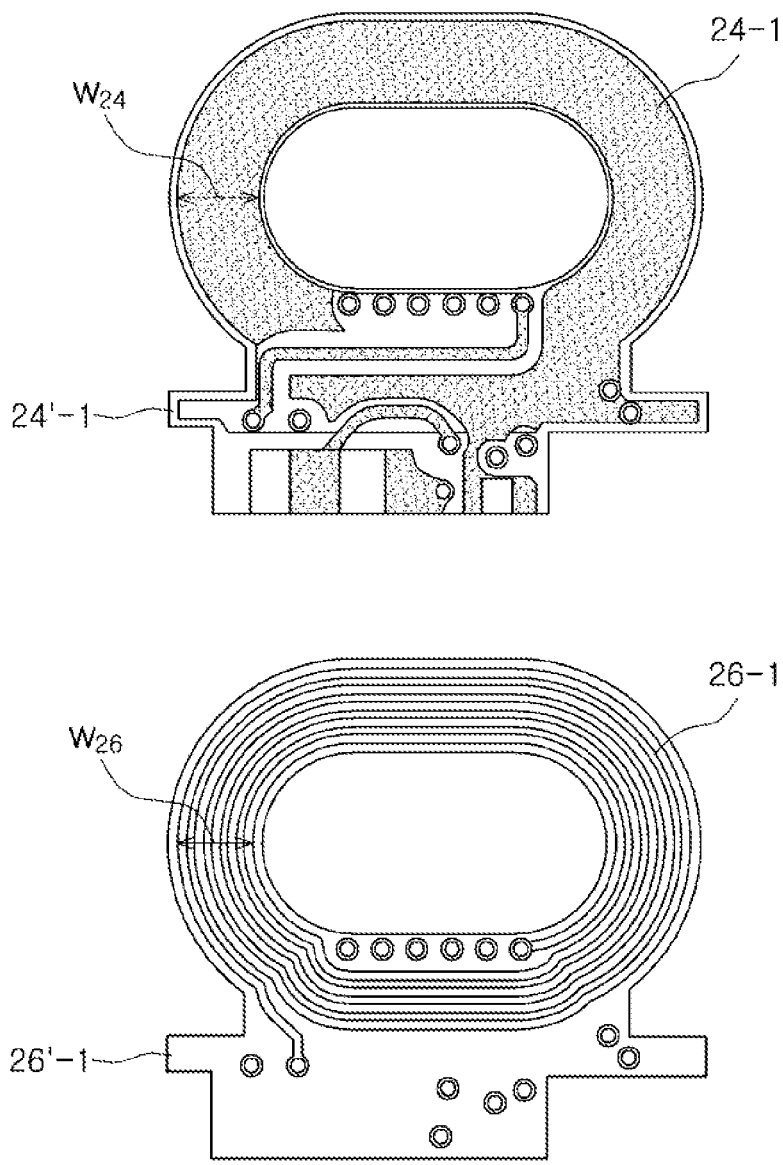
FIG. 13 is a plan view schematically illustrating two extracted layers of the first coil unit of the present inventive concept.
Figure 14:
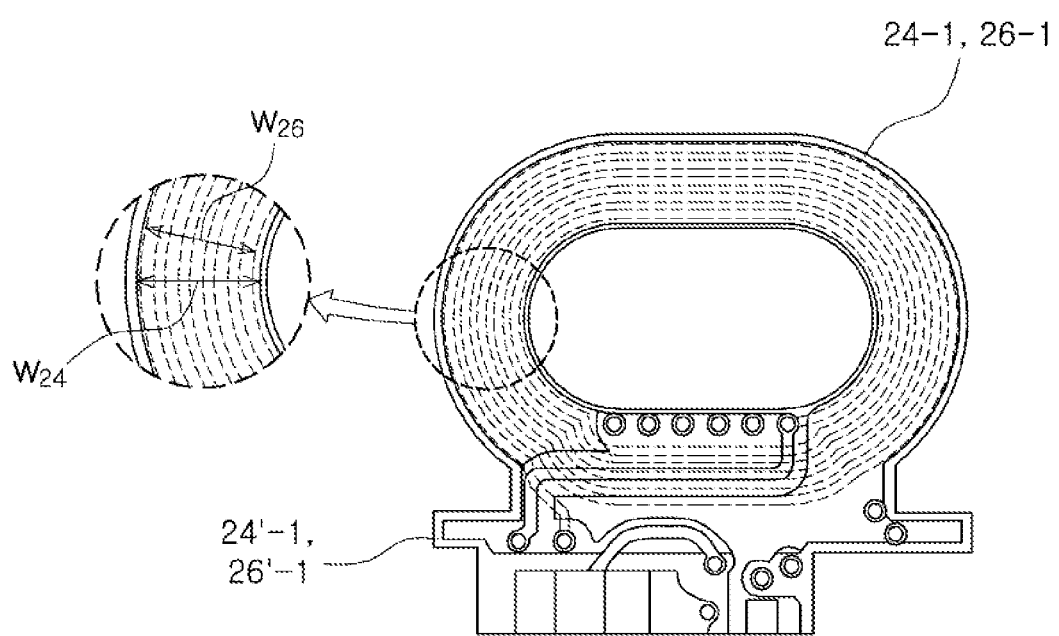
FIG. 14 is a plan view schematically illustrating two projected layers of the first coil unit of the present of the present inventive concept.

FIG. 13 is a plan view schematically illustrating two layers extracted from the first coil unit of the present inventive concept, and FIG. 14 is a plan view schematically illustrating two projected layers of the first coil unit of the present inventive concept.

Referring to FIGS. 13 and 14, a maximum width W24 of the edge of the shielding patterns 24-1 and 24-2 of the second layers 24'-1 and 24'-2 may be greater than a maximum width W26 of the edge of the Vcc patterns 26 formed on the third layer 26'-1. For example, EMI shielding effect may be increased by increasing an area of the shielding patterns 24-1 and 24-2 to be greater than an area of the Vcc pattern 26 on the whole.

Meanwhile, an area of the shielding patterns 24-1 and 24-2 formed on a single layer may be increased to be greater than an area of the inductor pattern formed on a single layer for the same reason.

As for the shielding patterns 24-1 and/or 24-2 of the second layers 24'-1 and/or 24'-2, a starting point and an ending point of the conductor like the shielding patterns 24-1 and 24-2, are separated, but main portion of the shielding patterns 24-1 and/or 24-2 may form at least 0.9 turn. The EMI shielding effect may be increased by increasing the area of the shielding patterns 24-1 and 24-2.

Figure 15:
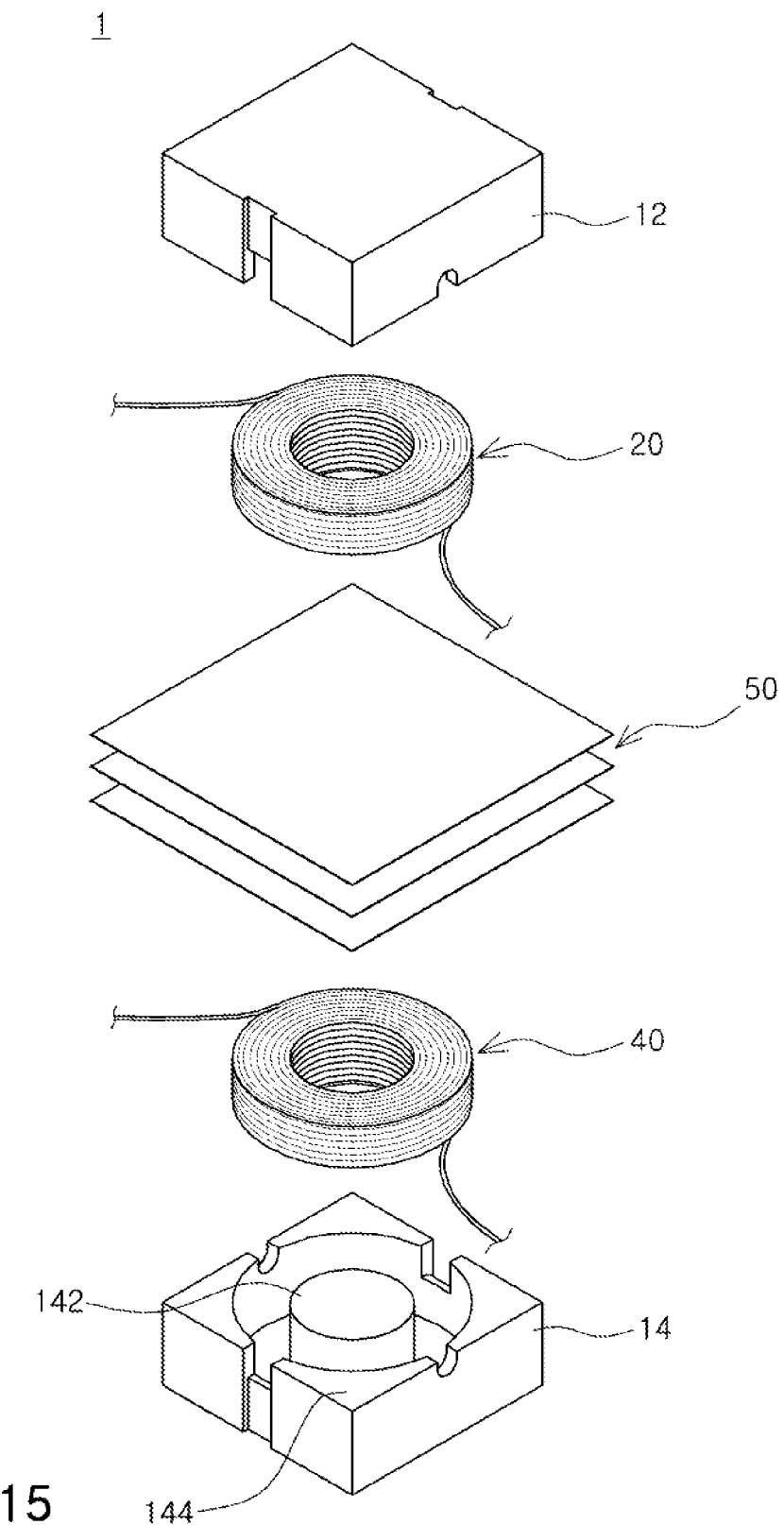
FIG. 15 is a perspective view schematically illustrating a transformer according to a second exemplary embodiment of the present inventive concept.
Figure 16:
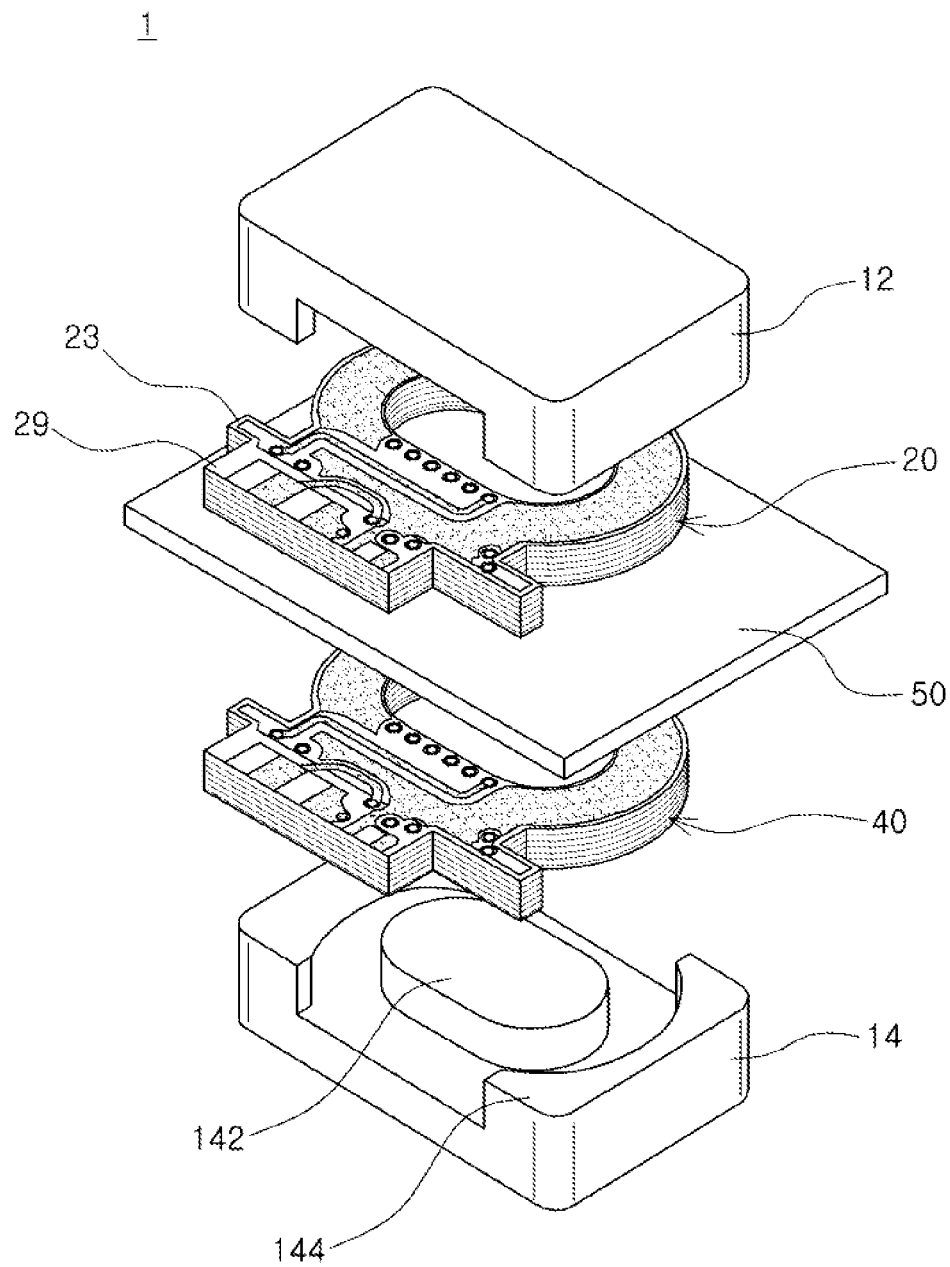
FIG. 16 is a perspective view schematically illustrating a transformer according to a third exemplary embodiment of the present inventive concept.
Figure 17:
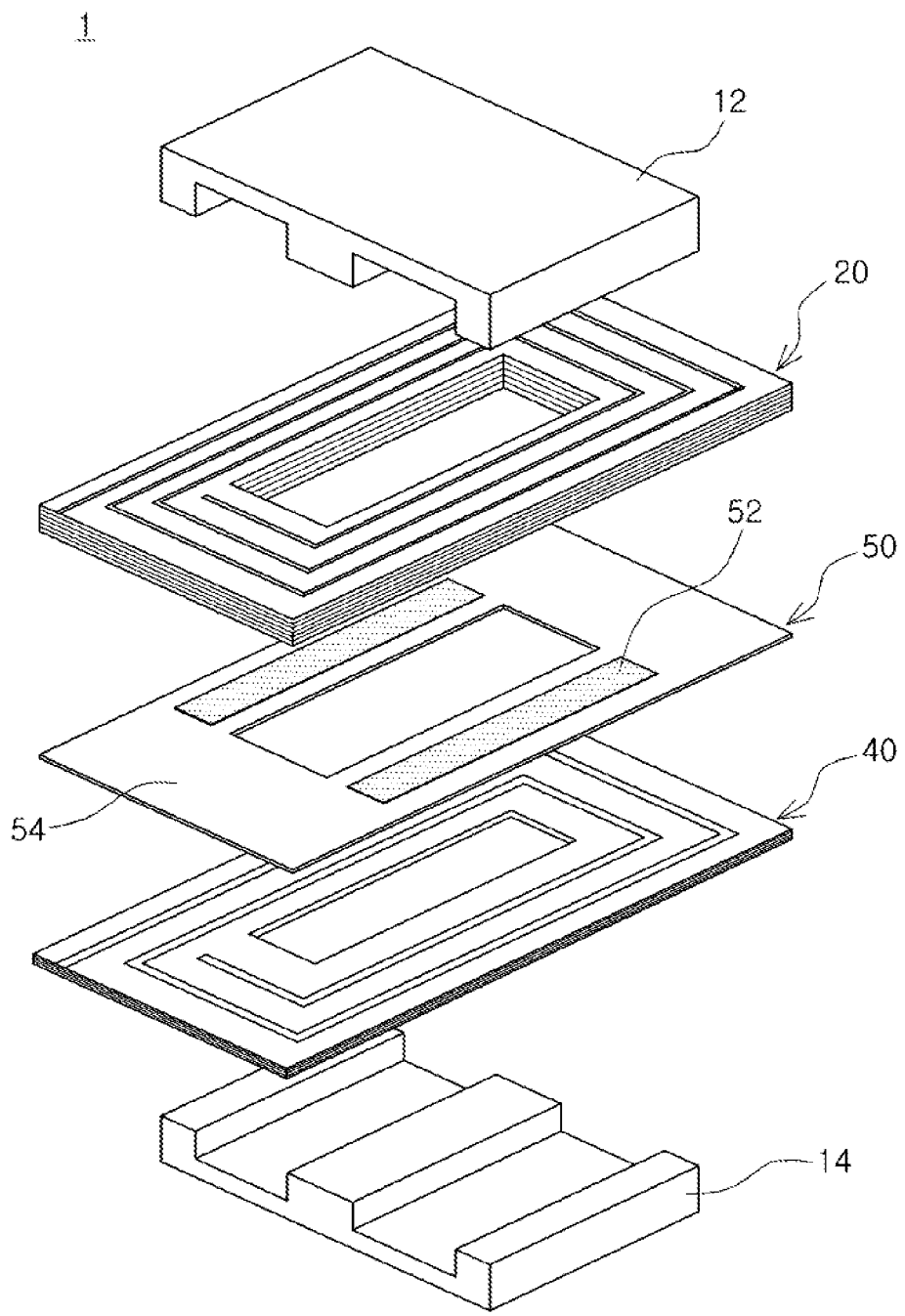
FIG. 17 is a perspective view schematically illustrating a transformer according to a fourth exemplary embodiment of the present inventive concept.

FIG. 15 is a perspective view schematically illustrating a transformer according to a second exemplary embodiment of the present inventive concept, FIG. 16 is a perspective view schematically illustrating a transformer according to a third exemplary embodiment of the present inventive concept, and FIG. 17 is a perspective view schematically illustrating a transformer according to a fourth exemplary embodiment of the present inventive concept.

In the description of the following exemplary embodiments, the content of the description of a transformer according to the first exemplary embodiment of the present inventive concept may be included unless it is contradictory.

Referring to FIG. 15, the first coil unit 20 and the second coil unit 40 may include a first conductive wire and a second conductive wire respectively wound and disposed within the magnetic cores 12 and 14.

The first conductive wire and the second conductive wire may be provided with an insulating distance therebetween, and the insulating distance may be secured by an insulating sheet 50 formed between the first coil unit 20 and the second coil unit 40.

The magnetic cores 12 and 14 may include a first core unit 12 in which the first conductive wire is disposed and a second core unit 14 in which the second conductive wire is disposed. In order to increase a creepage distance between the first conductive wire and the second conductive wire, the insulating sheet 50 may separate the first core unit 12 and the second core unit 14.

Also, in order to secure insulating performance of the first conductive wire and the second conductive wire, two or more insulating sheets 50 may be formed.

Also, a minimum distance between the first conductive wire and the second conductive wire disposed with the insulating sheet 50 interposed therebetween may be 0.4 mm.

Referring to FIG. 16, the second coil unit 40 may be formed as a laminated board. An inductor pattern formed within the first coil unit 20 and the second coil unit 40 may be provided with a number of turns appropriate for an output range of a voltage desired to be converted.

When the second coil unit 40 is a laminated board, the insulating sheet 50 may be included in order to secure an insulating distance between the first coil unit 20 and the second coil unit 40.

At least two or more thin layers may be formed between the first coil unit 20 and the second coil unit 40, and three or more layers may be formed between the first coil unit 20 and the second coil unit 40, thereby securing safety insulating distance, even in the case that a distance between the first coil unit 20 and the second coil unit 40 is within 0.4 mm, and the insulating sheet 50 may be omitted.

In the transformer 1 of the exemplary embodiment of FIG. 17, the first coil unit 20 and the second coil unit 40 may respectively be configured as a laminated board, and the first coil unit 20 and the second coil unit 40 may be formed as a single board. Here, the single board may further include an insulating layer 54 on which an insulating pattern 52 is formed, between the first coil unit 20 and the second coil unit 40.

In an exemplary embodiment of the present inventive concept, even in the case that the insulating layer 50 is omitted, an insulating distance between the first coil unit 20 and the second coil unit 40 may be sufficiently secured by adding three or more thin dummy layers between the first coil unit 20 and the second coil unit 40.

Figure 18:
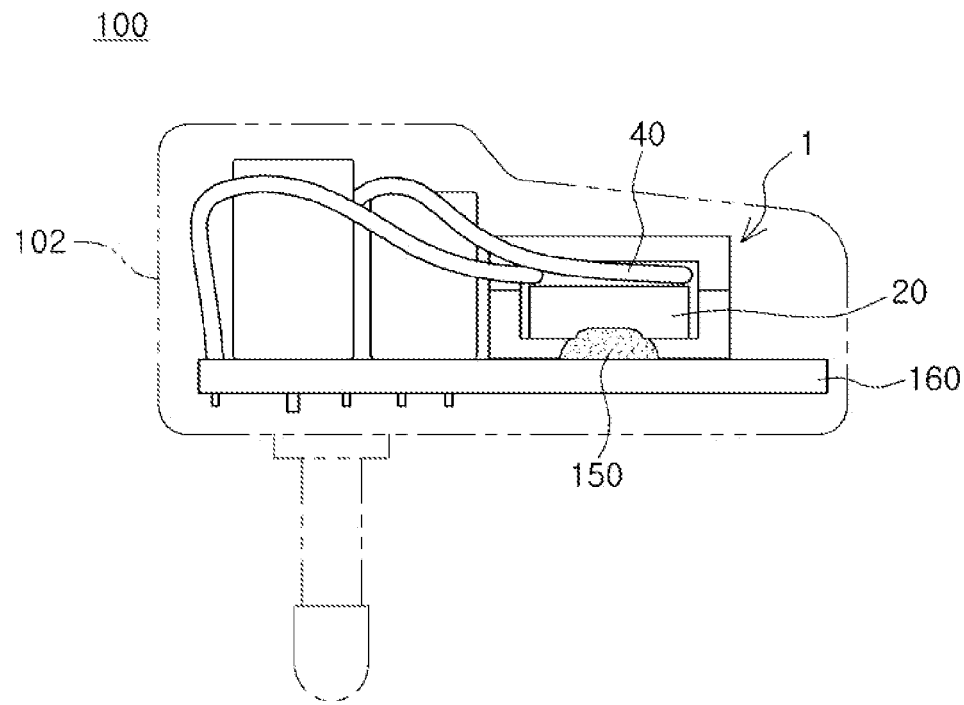
FIG. 18 is a side view schematically illustrating a transformer mounted on a circuit board within an adapter of the present inventive concept.
Figure 19:
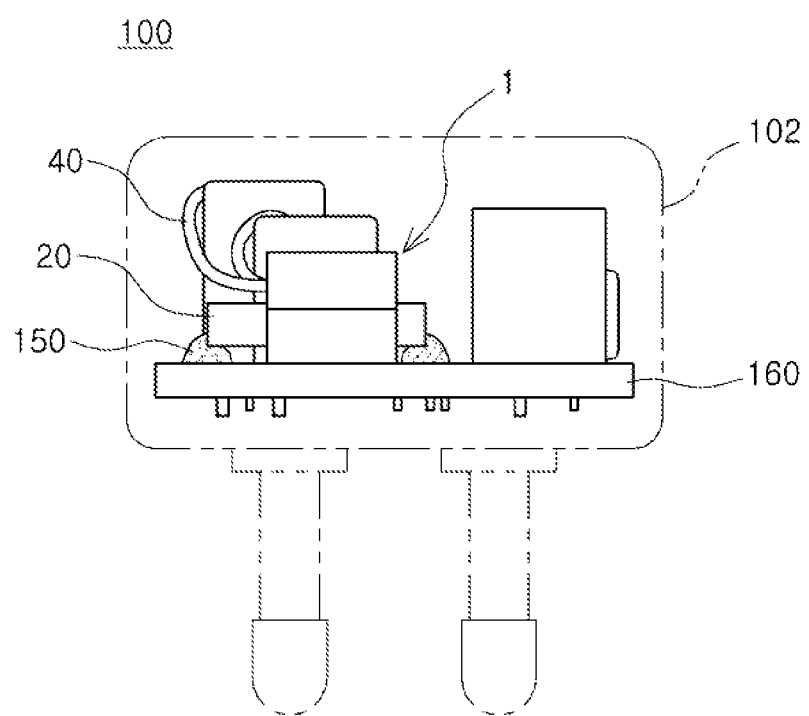
FIG. 19 is a front view schematically illustrating the transformer mounted on a circuit board within the first exemplary embodiment of an adapter of the present inventive concept.

FIG. 18 is a side view schematically illustrating a transformer mounted on a circuit board within an adapter 100 of an exemplary embodiment of the present inventive concept, and FIG. 19 is a front view schematically illustrating the transformer mounted on a circuit board within the first exemplary embodiment of the adapter 100 of the present inventive concept.

A transformer 1 may be horizontally mounted on a main board 160 within a space of a case 102 of an adapter as an exemplary embodiment of a power supply device illustrated in FIGS. 18 and 19. The transformer 1 may include any features of the exemplary embodiments of FIGS. 1-17.

Here, an electrode pad may be formed on the laminated board 20 led out to the outside of the magnetic core 10 (see FIG. 1) and coupled to an electrode of the main board 160 by solder 150 such that the laminated board 20 may be mounted on the main board 160 horizontally.

Figure 20:
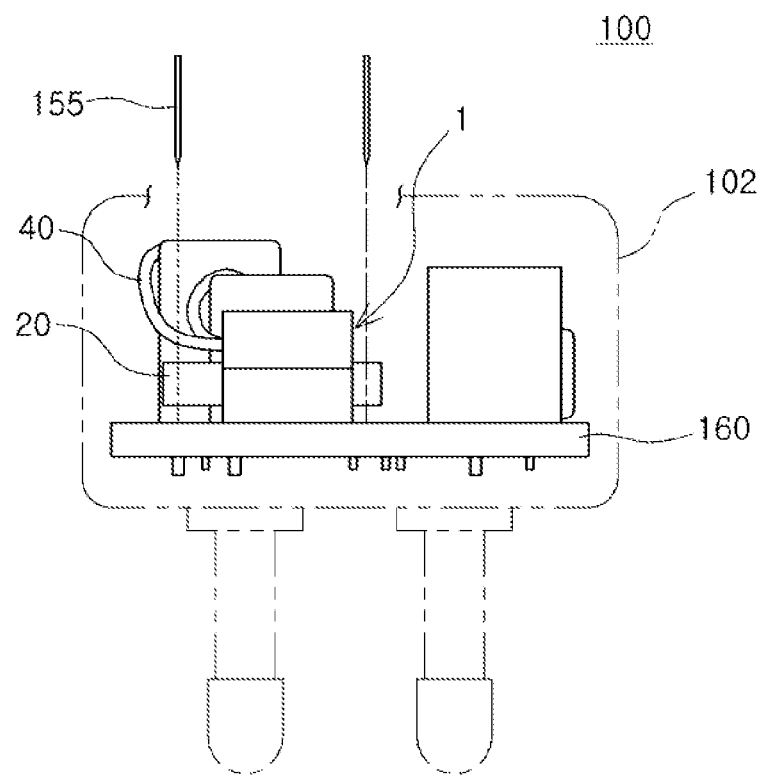
FIG. 20 is a front view schematically illustrating a transformer mounted on a circuit board within a second exemplary embodiment of an adapter of the present inventive concept.

FIG. 20 is a front view schematically illustrating a transformer mounted on a circuit board within a second exemplary embodiment of an adapter of the present inventive concept. Like the exemplary embodiment of FIGS. 18 and 19, the laminated board 20 may be mounted on the main board 160 horizontally. In this case, however, the main board 160 and the laminated board 20 may be connected by using a terminal pin 155. Here, the inductor pattern within the laminated board 20 may be electrically connected by the terminal pin 155

Figure 21:
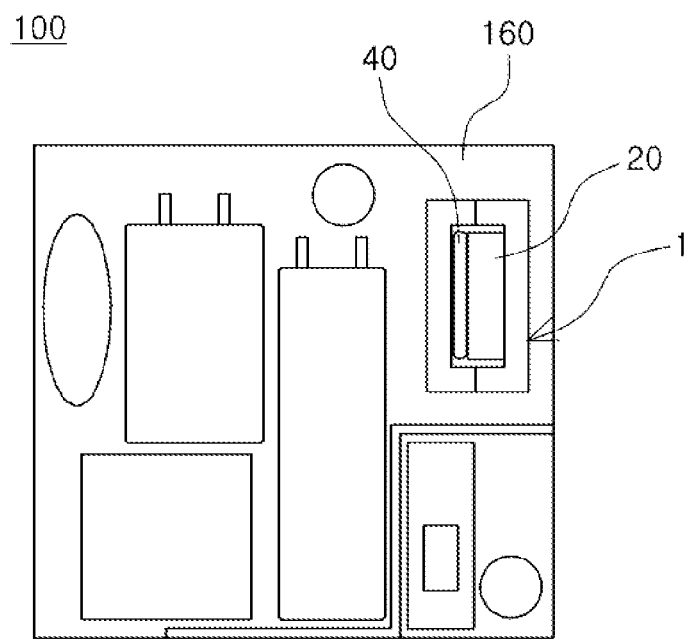
FIG. 21 is a plan view schematically illustrating a transformer mounted on a circuit board within a third exemplary embodiment of an adapter of the present inventive concept.
Figure 22:
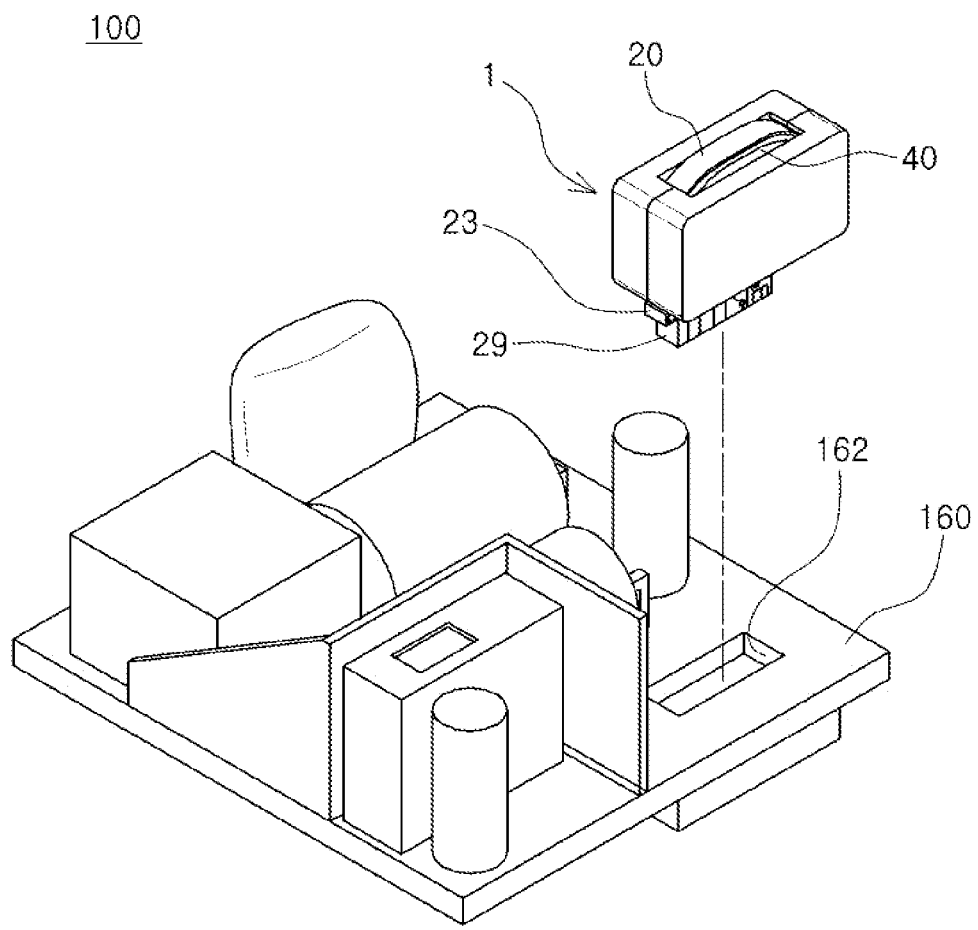
FIG. 22 is a perspective view schematically illustrating the transformer mounted on a circuit board within a fourth exemplary embodiment of an adapter of the present inventive concept.

FIG. 21 is a plan view schematically illustrating a transformer mounted on a circuit board within a third exemplary embodiment of an adapter of the present inventive concept, and FIG. 22 is a perspective view schematically illustrating the transformer mounted on a circuit board within a fourth embodiment of an adapter of the present inventive concept.

Unlike the exemplary embodiment of FIGS. 18 and 19 and unlike the exemplary embodiment of FIG. 20, in the exemplary embodiment of FIGS. 21 and 22, a transformer 1 may be vertically mounted on the main board 160. In this case, the connector 29 formed on the laminated board 20 may be insertedly coupled to a slot terminal 162 formed in the main board 160.

An insertion depth of the connector 29 may be defined by the stoppage protrusion 23 formed on the laminated board 20.

Figure 23:
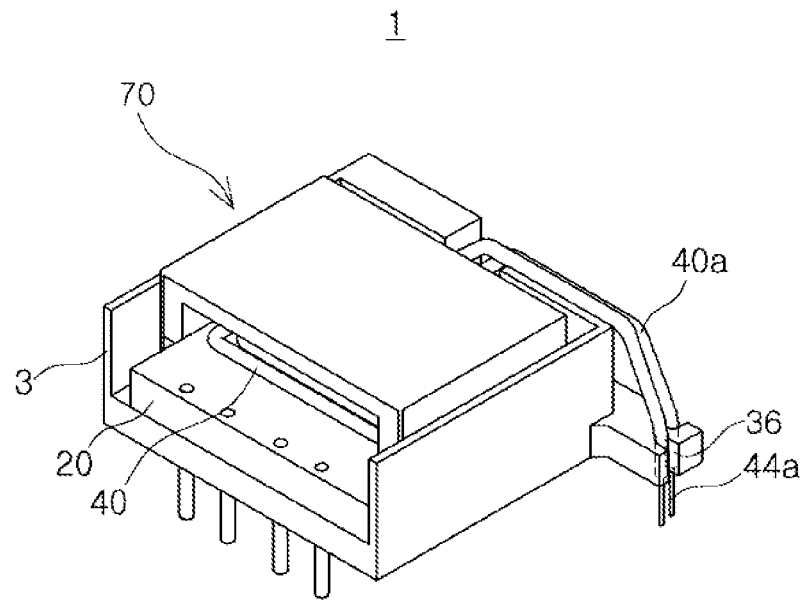
FIG. 23 is a perspective view schematically illustrating a transformer according to a fifth exemplary embodiment of the present inventive concept.
Figure 24:
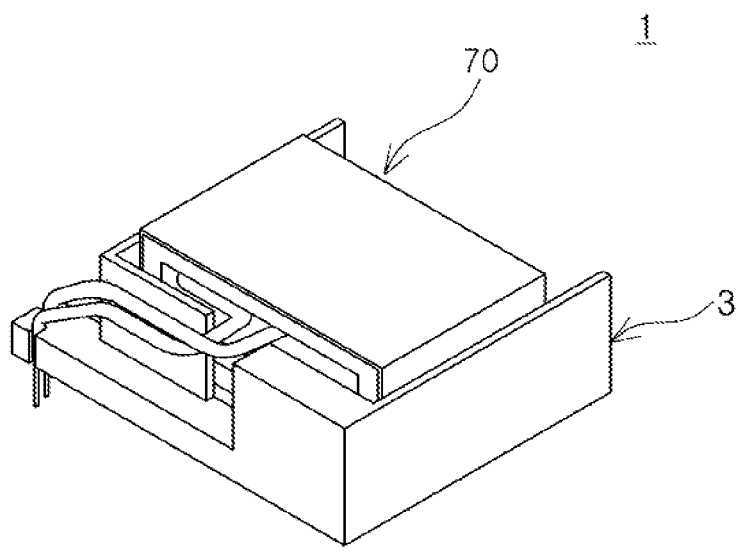
FIG. 24 is a perspective view illustrating a base illustrated in FIG. 23 in a different direction.
Figure 25:
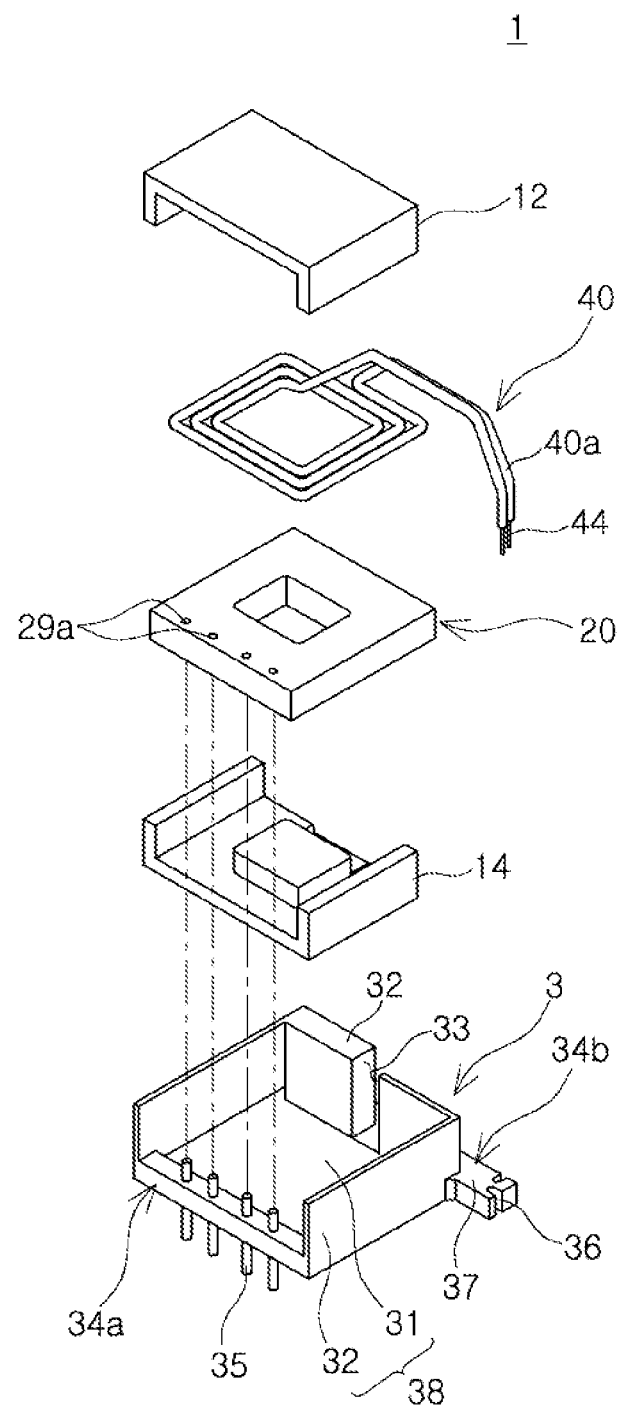
FIG. 25 is an exploded perspective view of the transformer illustrated in FIG. 23.
Figure 26:
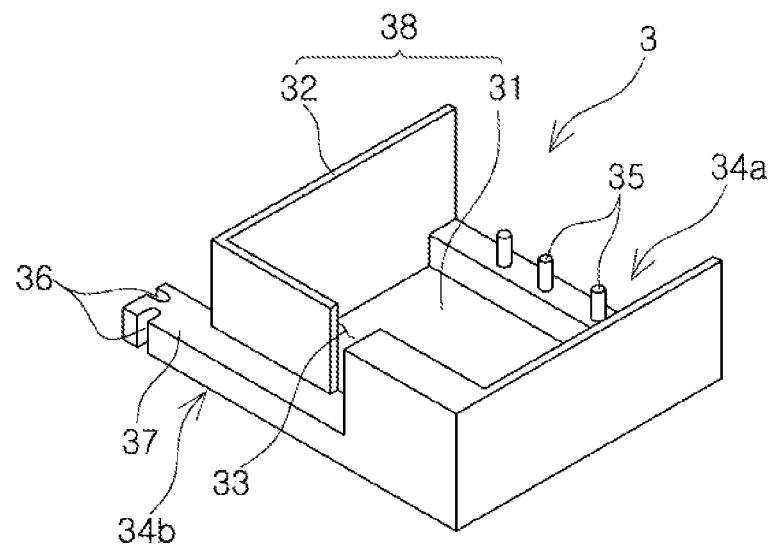
FIG. 26 is a perspective view of a base illustrated in FIG. 23 in a different direction.

FIG. 23 is a perspective view schematically illustrating a transformer according to a fifth exemplary embodiment of the present inventive concept, FIG. 24 is a perspective view illustrating a base illustrated in FIG. 23 in a different direction, FIG. 25 is an exploded perspective view of the transformer illustrated in FIG. 23, and FIG. 26 is a perspective view of a base illustrated in FIG. 23 in a different direction.

Referring to FIGS. 23 through 26, a transformer 1 according to an exemplary embodiment of the present inventive concept may be configured to be similar to any one of the transformers according to the first to fourth exemplary embodiments as described above, and may further include a base 3.

Thus, detailed descriptions of components identical to those of the exemplary embodiments of the present inventive concept will be omitted, and only the base 3, a different component, will largely be described.

The base 3 according to an exemplary embodiment of the present inventive concept may accommodate a coil assembly 70 formed by coupling the first and second coil units 20 and 40. The coil assembly 70 is fixedly coupled to the interior of the base 3.

To this end, referring to FIG. 25, the base 3 may include an accommodation portion 38 and terminal portions 34a and 34b Referring to FIG. 25, the accommodation portion 38, a space in which the coil assembly 70 is accommodated or coupled, may include an installation portion 31 in which the coil assembly 70 is installed and at least one side wall 32 formed to surround the coil assembly 70.

The installation portion 31 may be a plate with a flat bottom surface. However, the present disclosure is not limited thereto and may be variously modified. For example, at least one hole may be formed in the installation portion 31 to smoothly dissipate heat or the installation portion 31 may be formed to have a lattice or a radial frame form.

The side wall 32 may be formed to be protruded upwardly from the installation portion 31. The accommodation portion 38 may be configured as a vessel by the installation portion 31 and the side wall 32 and configured as a space accommodating the coil assembly 70.

The side wall 32 may protect the coil assembly 70 and secure insulation between the coil assembly 70 and other electronic components mounted on a main board 160 (for example, 160 in FIG. 18).

Thus, if an electronic component is not disposed in a position adjacent to the coil assembly 70 or if insulation does not need to be secured, the side wall 32 in the corresponding direction may be omitted.

Also, the side wall 32 may have at least one coil outlet 33 which is a coil lead-out hole. The coil outlet 33 may be formed as a recess and may be formed by cutting out a portion of the side wall 32.

The coil outlet 33 may be used as a passage through which lead wires 40a (see FIG. 25) of the second coil unit 40 formed as conductive wires 44 are led out to the outside of the accommodation portion 38. Thus, the coil outlet 33 may be formed to have a width (or height) greater than a diameter of the lead wires 40a. Also, according to an exemplary embodiment of the present inventive concept, at least two lead wires 40a may be lead out through the coil outlet 33. Thus, the coil outlet 33 may be provided with a size allowing two lead wires 40a to be easily led out.

Since only the lead wires 40a of the second coil unit 40 is led out through the coil outlet 33, the coil outlet 33 may be formed to correspond to a position in which the second coil unit 40 is disposed. In the case of an exemplary embodiment of the present inventive concept, the second coil unit 40 may be laminated and disposed above the first coil unit 20. Thus, the coil outlet 33 may be formed as a recess by cutting away material up to a middle portion of the side wall 32, rather than the entirety of the side wall 32.

On the other hand, when the second coil unit 40 is laminated and disposed below the first coil unit 20, the coil outlet 33 may be formed as a recess formed by cutting away the entirety of the side wall 32.

Meanwhile, in an exemplary embodiment of the present inventive concept, only a single coil outlet 33 may be used. However, the present disclosure is not limited thereto and may be variously applied. For example, a plurality of coil outlets 33 may be formed as needed and the lead wires 40a may be distributedly or divisibly led out through to the respective coil outlets 33. Also, the coil outlet 33 may be formed as a hole, rather than as a recess.

The terminal portions 34a and 34b may include a first terminal portion 34a and a second terminal portion 34b. Here, the first terminal portion 34a may be a portion used to electrically connect the first coil unit 20 to the main board, and the second terminal portion 34b may be a portion used to electrically connect the second coil unit 40 to the main board.

Referring to FIG. 25, the first terminal portion 34a may include a plurality of terminal pins 35.

The terminal pins 35 may be fastened in a manner of penetrating through the first terminal portion 34a. Thus, the terminal pins 35 may be disposed to be protruded from both upper and lower portions of the terminal portion 34a.

Here, the terminal pins 35 protruded from the upper portion of the first terminal portion 34a may be coupled to the first coil unit 30 of the coil assembly 70. For example, the terminal pins 35 may be inserted into terminal holes 29a formed in the first coil unit 20 and may be electrically connected to the first coil unit 20 through a conductive bonding member (not shown) such as soldering, or the like.

Thus, as illustrated in FIG. 25, the first terminal portion 34a may be formed in a position corresponding to a portion of the coil unit 20 where the terminal holes 29a are disposed, and the terminal pins 35 may respectively be fastened to positions corresponding to the terminal holes 29a.

Here, the terminal holes 29a of the first coil unit 20 may be formed to penetrate through the terminal 292 of FIG. 3 as described above. Also, in order to enhance electrical reliability, a conductive material may be applied to the interior of the terminal holes 29a.

Thus, the terminal pins 35 inserted into the terminal holes 29a may be electrically connected to the terminal 292 and the conductive pattern 22-12 through a conductive bonding member (not shown).

According to an exemplary embodiment of the present inventive concept, the first terminal portion 34a may be extendedly formed along any one corner in the quadrangular installation portion 31. However, the present disclosure is not limited thereto and may be variously modified as needed. For example, the first terminal portion 34a may be formed in a vertex portion, may be formed within the installation portion 31, or the like.

Meanwhile, the terminal pins 35 provided downwardly from the first terminal portion 34a may be bonded to the main board. Thus, the first coil unit 20 may be electrically connected to the main board through the terminal pins 35.

The second terminal portion 34b may be formed in a position spaced apart from the first terminal portion 34a by a predetermined distance, and in an exemplary embodiment of the present inventive concept, the second terminal portion 34b may be formed on a surface opposing the first terminal portion 34a.

Referring to FIG. 25, the second terminal portion 34b may guide the lead wires 40a of the second coil unit 40. To this end, the second terminal portion 34b may include a terminal strip (or a terminal block) 37 supporting the lead wires 40a of the second coil unit 40 led out from the accommodation portion 38 and may include a plurality of fastening recesses 36 to which ends of the lead wires 40a are fastened.

The terminal strip 37 may be protruded to be convex below the lead wires 40a to support the lead wires 40a, and may have a fastening recess 36 formed in an end thereof.

As illustrated in FIG. 23, the fastening recess 36 may be a portion to which the lead wires 40a of the second coil unit 40, from which an insulating coating has been partially removed, are insertedly and fixedly fastened. The fastening recess 36 may be formed in a protruded end portion of the terminal strip 37.

As the lead wires 40a are fastened to the fastening recess 36, the portion of the lead wire 40, from which the coating has been removed to expose the conductive wire 44, may be protruded downwardly from the second terminal portion 34b to serve as a terminal pin 44a.

Thus, the base 3 according to an exemplary embodiment of the present inventive concept may be mounted on and bonded to the main board through the terminal pins 35 of the first terminal portion 34a and the lead wires 40a of the second coil unit 40 fastened to the second terminal portion 34b.

Here, the lead wires 40a of the second coil unit 40 may be firmly bonded to the fastening recess 36 through a bonding member. However, the present disclosure is not limited thereto and may be variously applied. For example, a protrusion may be formed within the fastening recess 36 or the lead wires 40a of the second coil unit 40 may be insertedly coupled to the interior of the fastening recess 36 through a shape of the fastening recess 36, or the like.

Meanwhile, referring to FIG. 26, an end of the terminal strip 37 according to an exemplary embodiment of the present inventive concept may be protruded by a predetermined distance from the installation portion 31 forming a body of the base 3, to secure an insulating distance.

The transformer 1 according to an exemplary embodiment of the present inventive concept may be manufactured to have a small size, and thus, when both the first terminal portion 34a and the second terminal portion 34b are formed on one side (or in a corner) of the installation portion 31, a distance between the first terminal portion 34a and the second terminal portion 34b may be smaller than or equal to an insulating distance. Also, since the lead wires 40a of the second terminal portion 34b and the first coil unit 20 are disposed to be adjacent due to the coil outlet 33, it is difficult to secure an insulating distance.

Thus, in order to secure an insulating distance from the foregoing elements, the base 3 according to an exemplary embodiment of the present inventive concept may be configured such that the terminal strip 37 of the second terminal portion 34b is protruded from the installation portion 31 by a predetermined distance. Here, the protrusion direction may be any direction as long as the terminal strip 37 becomes located away from the first terminal portion 34a or the coil outlet 33. In other words, the protrusion direction may be a direction away from the first terminal portion 34 or the coil outlet 33.

Also, the protrusion distance of the terminal strip 37 may be defined as a distance over which an insulating distance from the lead wire 40a and the first coil unit 20 is exposed through the coil outlet 33.

Since the transformer 1 according to an exemplary embodiment of the present inventive concept configured as described above has the base 3, it may be easily mounted on the main board.

If the base 3 such as in the foregoing exemplary embodiments is not used, lead wires 40a of the second coil unit 40 need to be mounted on the main board through a manual operation, increasing a manufacturing time. However, when the base 3 is provided as in an exemplary embodiment of the present inventive concept, since the base 3, to which the coil assembly 70 is coupled through an automated process, is mounted on the main board, manufacturing is facilitated and the manufacturing time may be reduced.

Meanwhile, the transformer provided with the base according to exemplary embodiments of the present inventive concept may be variously modified.

Figure 27:
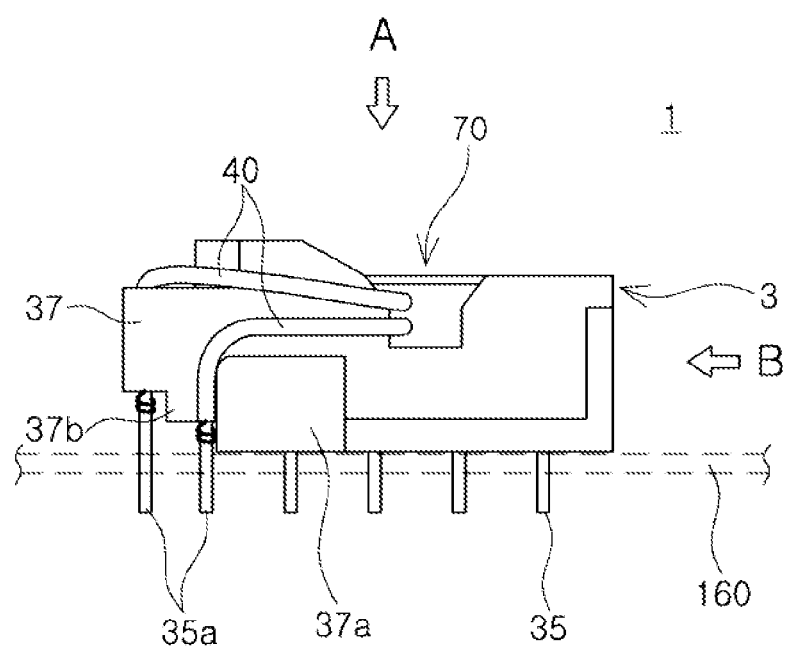
FIG. 27 is a side view illustrating a transformer according to a sixth exemplary embodiment of the present inventive concept.
Figure 28:
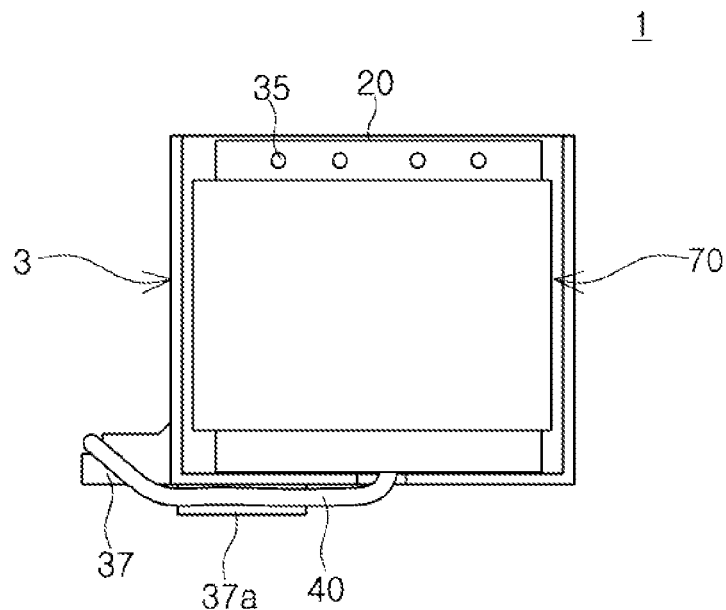
FIG. 28 is a plan view according to a direction A in FIG. 27.
Figure 29:
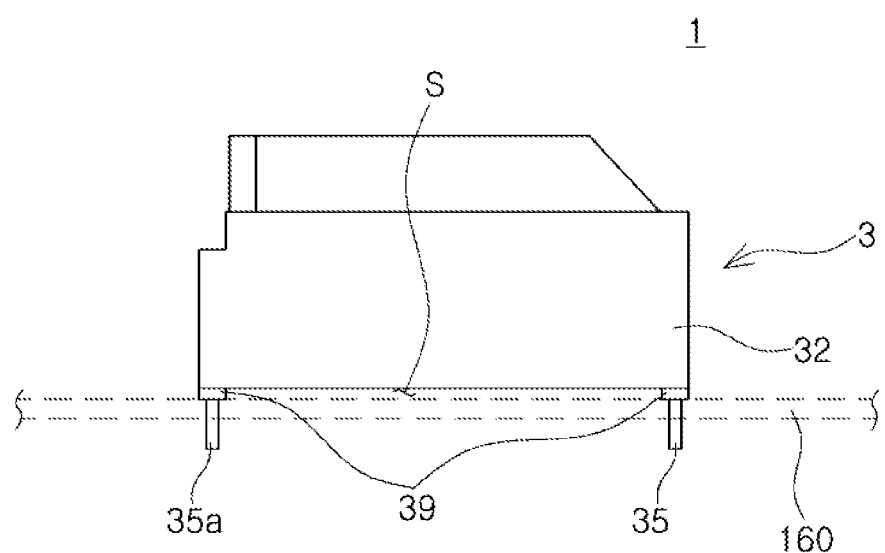
FIG. 29 is a side view according to a direction B in FIG. 27.

FIG. 27 is a side view illustrating a transformer according to a sixth exemplary embodiment of the present inventive concept, FIG. 28 is a plan view according to a direction A in FIG. 27, and FIG. 29 is a side view according to a direction B in FIG. 27.

Referring to FIGS. 27 through 29, a transformer 1 according to an exemplary embodiment of the present inventive concept may be configured to be similar to that of the transformer 1 as described with reference to FIG. 23, and may have a difference in structure of the base 3.

In the case of the base 3 according to an exemplary embodiment of the present inventive concept, a first terminal portion 34a may be configured to be identical to that of the base 3 as described above, so the description thereof will be omitted.

Referring to FIG. 27, for example, the second terminal portion 34b according to an exemplary embodiment of the present inventive concept may include a terminal strip 37, a protrusion portion 37a, and terminal pins 35a.

The terminal strip 37 may be configured to be similar to the terminal strip 37 of FIG. 26 of the foregoing base, but it may not include the fastening recess 36 and may include a plurality of terminal fins 35a protruded downwardly, instead.

Thus, the lead wires 40a of the second coil unit 40 led out through the coil outlet 33 may be distributedly or divisibly disposed on both sides based on the terminal strip 37 as the center and connected to the terminal pins 35a so as to be fastened. In this case, the terminal strip 37 may be interposed between the two lead wires 40a to prevent the two lead wires 40a from being in contact.

Also, as illustrated in FIG. 27, the terminal strip 37 of the second terminal portion 34b may have a step 37b formed in a portion to which the terminal pins 35a are fastened, and the terminal pins 35a may be fastened along the step 37b. Namely, by means of the step 37b, the terminal pins 35a may be fastened to the terminal strip 37 in different horizontal planes.

The step 37b according to an exemplary embodiment of the present inventive concept may be formed such that at thickness of the terminal strip 37 is reduced toward an external surface, e.g., toward the direction A in FIG. 27. Thus, the terminal pin 35a disposed in an external surface may be fastened to the terminal strip 37 at a portion higher than that of the terminal pin 35a disposed in an inner side.

This configuration is to prevent a generation of short-circuits during a process of connecting the lead wires 40a to the terminal pins 35a disposed to be adjacent and soldering them. For example, when the terminal pins 35a are fastened to the terminal strip 37 on the same horizontal plane, an interval between the terminal pins 35a should be increased due to a volume of the lead wires 40a wound around the terminal fins 35a in order to avoid a short-circuit.

In this case, since the terminal pins 35 are disposed to be greatly spaced apart from one another, a size of the terminal strip 37 may be also increased, increasing an overall size of the transformer 1.

In contrast, when the terminal pins 35a are fastened in different horizontal planes as in an exemplary embodiment of the present inventive concept, since the lead wires 40a are wound around the terminal pins 35a in different vertical positions, an interval between the terminal pins 35a may be minimized. Accordingly, a size of the transformer 1 may also be minimized.

Meanwhile, contrary to the present exemplary embodiment, step may be formed such that the thickness of the terminal strip 37 is reduced toward the interior of the base 3, and the terminal pins 35a are fastened. In this case, however, it is difficult to apply molten solder to the terminal pins 35 to which the lead wires 40a are connected.

However, when the step 37b is formed such that the thickness of the terminal strip 37 is reduced toward an external surface as in an exemplary embodiment of the present inventive concept, since the terminal pins 35a (namely, the connection portion of the lead wires) of the second terminal portion 34b may be simultaneously put in a molten solder lead pot (or a dipping device), and thus, molten solder may be applied to all of the terminal pins 35a of the second terminal portion 35b through a single process.

The protrusion portion 37a may be protruded from a lower side of the lead wires 40a of the second coil unit 40 led out through the coil outlet 33 to support the lead wires 40a to prevent the lead wires 40a from sagging to a lower side of the installation portion 31. Thus, the protrusion portion 37a may be protruded in various forms as long as it can easily support the lead wires 40a.

Also, as illustrated in FIG. 29, the base 3 according to an exemplary embodiment of the present inventive concept may include at least one support portion 39 formed on a lower surface thereof, namely, in a surface opposing the installation portion 31.

The support portion 39 may be provided to separate the lower surface of the base 3 and the main board when the base 3 is mounted on the main board. In this case, an air may flow through a space S formed between the base 3 and the main board, increasing a heat dissipation effect.

The support portion 39 according to an exemplary embodiment of the present inventive concept may be formed as lower portions of the first and second terminal portions 34a and 34b are protruded, for example. However, the present disclosure is not limited thereto and may be variously modified. For example, the support portion 39 may be formed as a protrusion, a partition, or the like.

Figure 30:
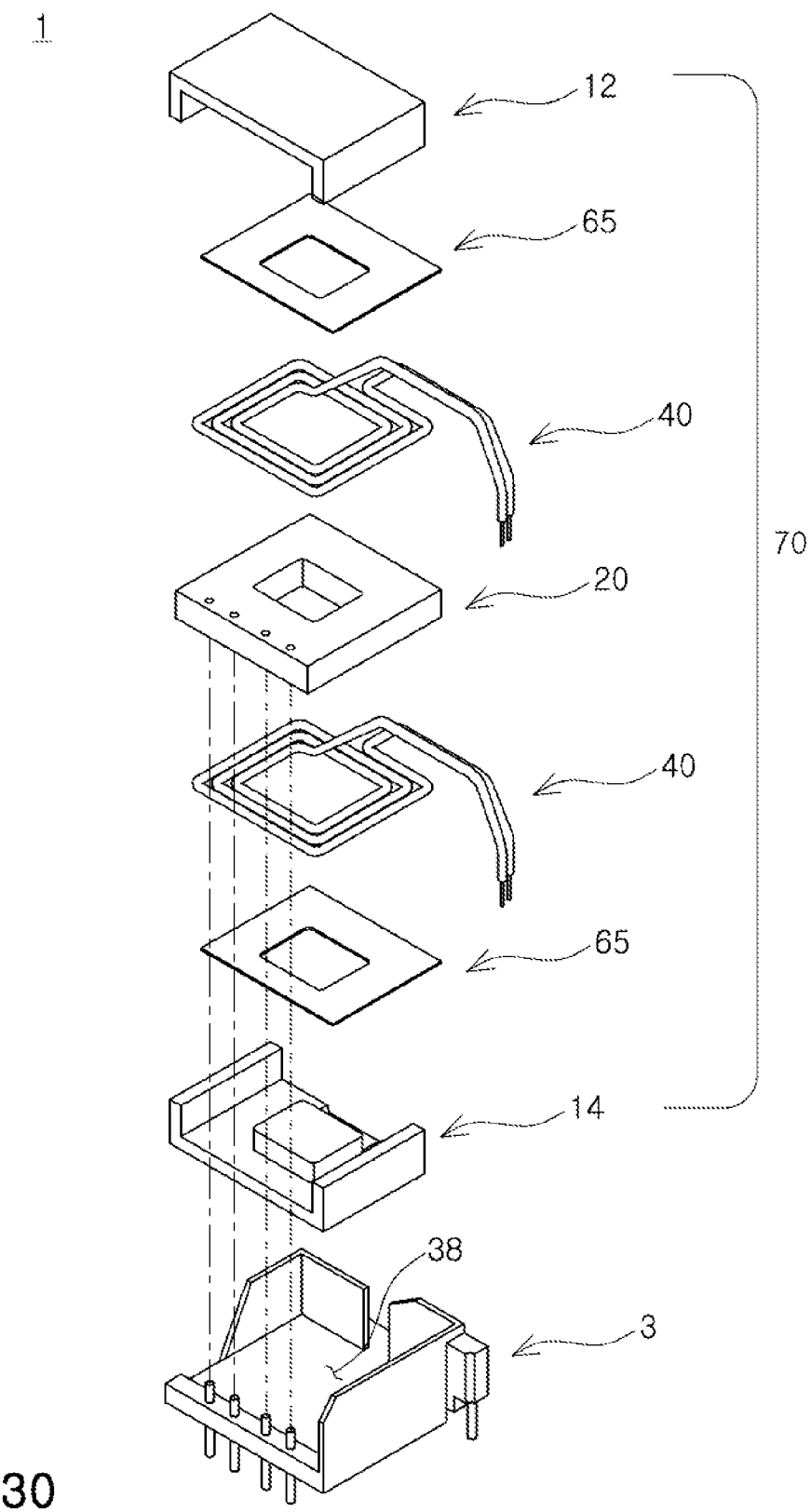
FIG. 30 is an exploded perspective view illustrating a transformer according to a seventh exemplary embodiment of the present inventive concept.
Figure 31:
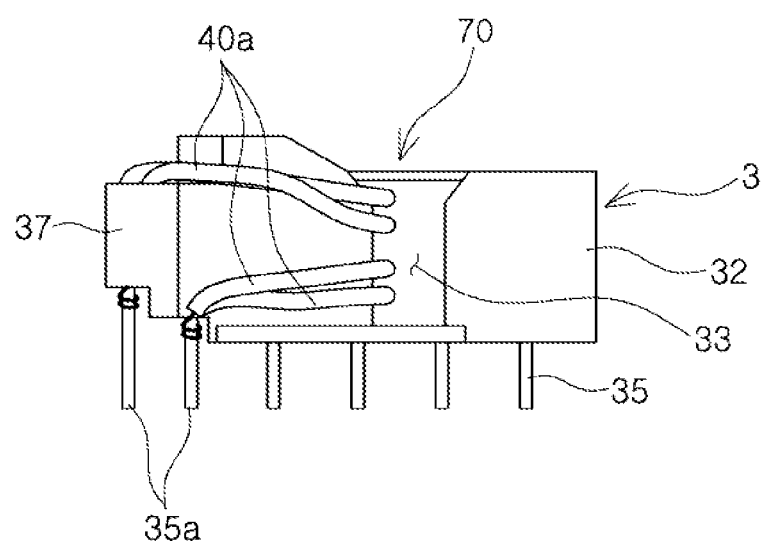
FIG. 31 is a side view illustrating the transformer illustrated in FIG. 30.

FIG. 30 is an exploded perspective view illustrating a transformer according to a seventh exemplary embodiment of the present inventive concept, and FIG. 31 is a side view illustrating the transformer illustrated in FIG. 30.

First, referring to FIG. 30, a coil assembly 70 of a transformer according to an exemplary embodiment of the present inventive concept may include magnetic cores 12 and 14, a first coil unit 20, a second coil unit 40, and a base 3, similar to the foregoing exemplary embodiments. The second coil unit 40 may be provided in plural (for example, two second coil units), and the two second coil units 40 may respectively be disposed above and below the first coil unit 20.

Here, the plurality of second coil units 40 may be connected to be parallel. In this case, leakage inductance may be reduced to increase efficiency of the transformer 1 and reduce a heating temperature.

Meanwhile, the present inventive concept is not limited to the forgoing configuration and may be variously applied. For example, the plurality of second coil units 40 may be connected in series, or the like.

Also, an insulating member 65 may be provided between the second coil unit 40 and the magnetic cores 12 and 14. The insulating member 65 may be a doughnut-shaped piece of insulating tape, or the like, but the present disclosure is not limited thereto.

The plurality of second coil units 40 according to an exemplary embodiment of the present inventive concept may be laminated below and above the first coil unit 20. Thus, as illustrated in FIG. 31, a coil outlet 33 of a base 3 may be formed as a recess by cutting away the entirety of a side wall 32 in a vertical direction. Thus, both the second coil units 40 below and above the first coil unit 20 may be easily led out from an accommodation portion 38.

Also, the base 3 according to an exemplary embodiment of the present inventive concept may be formed such that a terminal strip 37 of the second terminal portion 34b is protruded outwardly, and four-strand conductive lead wires 40a led out through the coil outlet 33 may be distributed so as to be disposed to have two strands on both sides based on the terminal strip 37 as the center and fastened to the terminal pins 35a. As described above, since the transformer according to exemplary embodiments of the present inventive concept has the base, the transformer may be easily mounted on a main board and may be easily manufactured.

Figure 32:
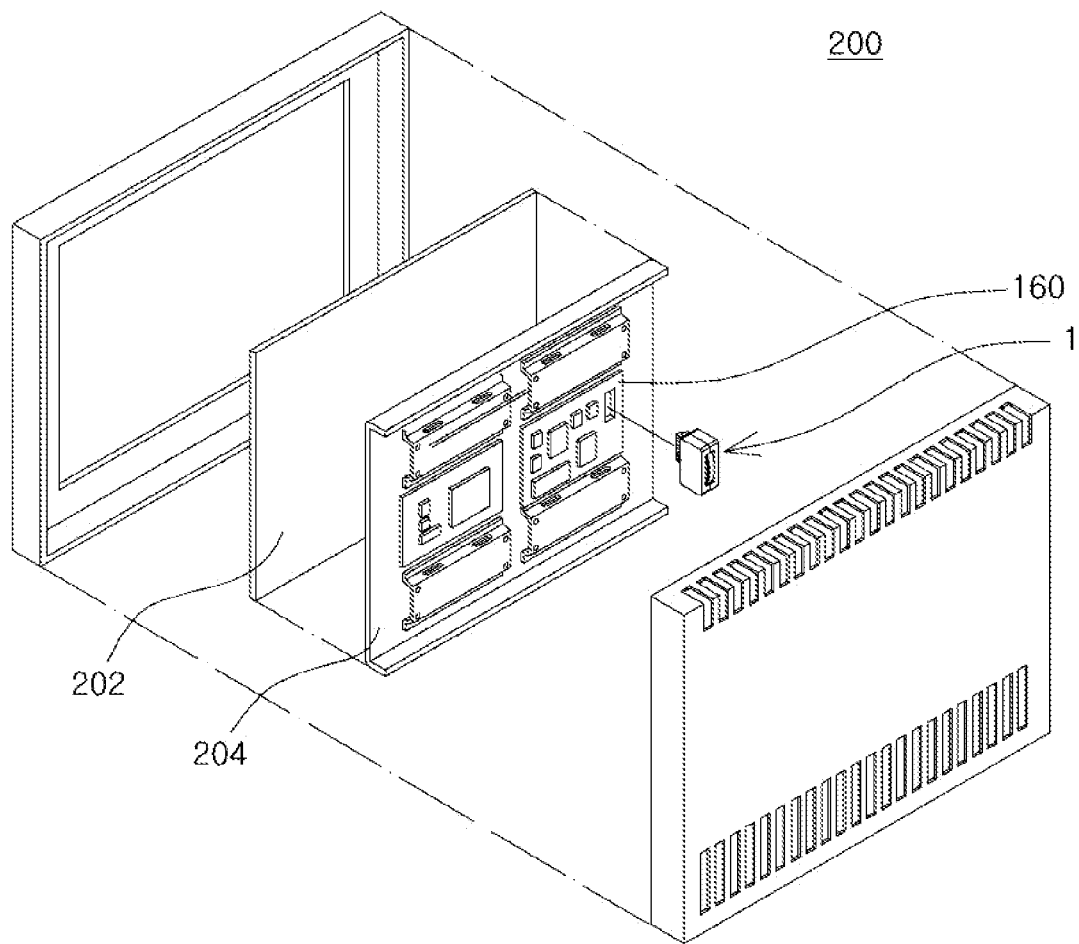
FIG. 32 is a schematic perspective view illustrating a transformer mounted on a circuit board within a power supply device of a flat panel display unit of the present inventive concept.

FIG. 32 is a schematic perspective view illustrating a transformer mounted on a circuit board within a power supply device of a flat panel display unit of the present disclosure.

A transformer 1 according to an exemplary embodiment of the present inventive concept may also be applied to a power supply device of a thin display device 200 such as a TV, a computer monitor, or the like.

The display device 200 illustrated in FIG. 32 may include a display panel 202 and a chassis 204 on which a printed circuit board (PCB) 160 of a power supply device supplying driving power of the display panel 202 is mounted.

Since the miniaturized transformer 1 according to an exemplary embodiment of the present inventive concept is mounted, the power supply device may be further miniaturized.

Figure 33:
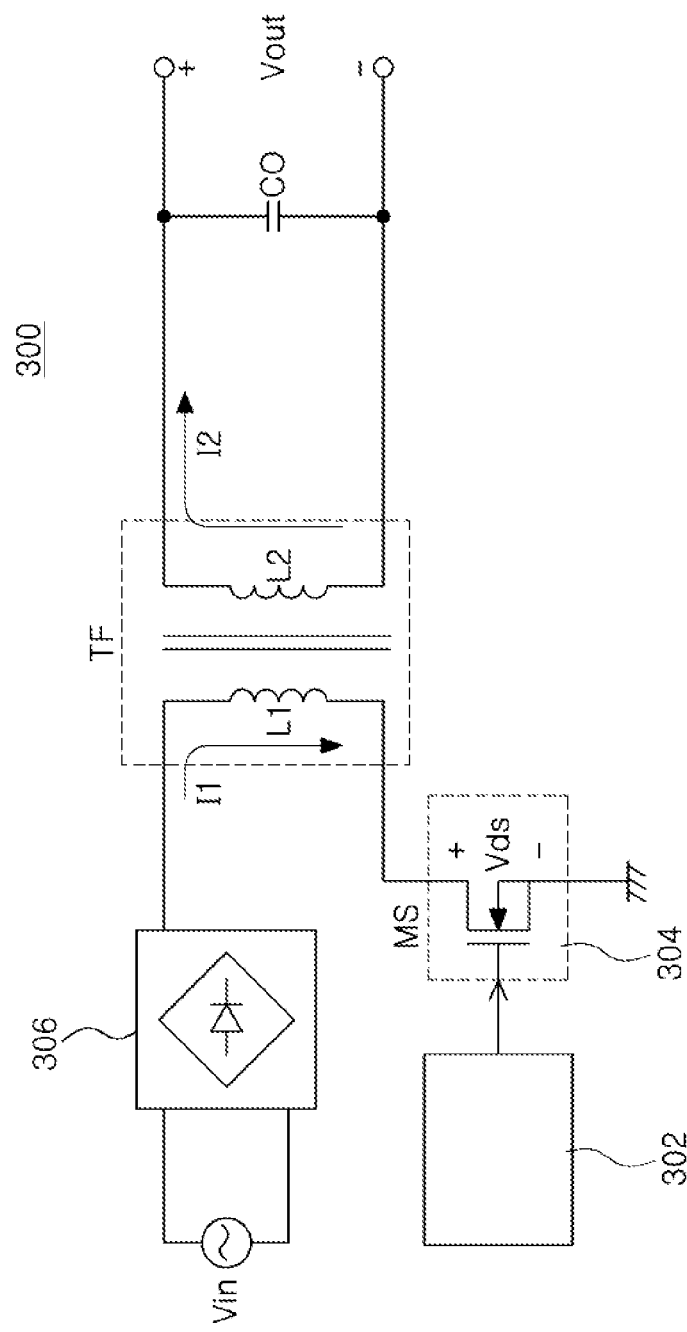
FIG. 33 is a circuit diagram of a flyback converter of an adapter employing a transformer according to an exemplary embodiment of the present inventive concept.

FIG. 33 is a circuit diagram of a flyback converter of an adapter employing a transformer according to an exemplary embodiment of the present inventive concept.

Specifically, FIG. 33 is a circuit diagram of a flyback converter 300 of an adapter as an example of a power supply device employing a transformer TF according to an exemplary embodiment of the present inventive concept.

An AC input voltage Vin may be rectified by a rectifier 306 and provided to the transformer TF, and in this case, a flyback switching circuit 302 may switch on or off a main switch MS in a main switch portion 304.

A voltage Vds between a drain and a source of the main switch MS may be controlled according to the ON/OFF operation of the main switch MS.

For example, when the main switch MS is switched on, a primary current I1 having a predetermined waveform may flow to a primary coil L1 of the transformer TF through the main switch MS, and when the main switch MS is switched off, energy of the primary coil L1 of the transformer TF may be induced to a secondary coil L2 to allow a secondary current I2 having a different waveform to flow.

Through such operation processes, a voltage of the secondary coil L2 of the transformer TF may be supplied as an output voltage Vout through an output capacitor CO.

Figure 34:
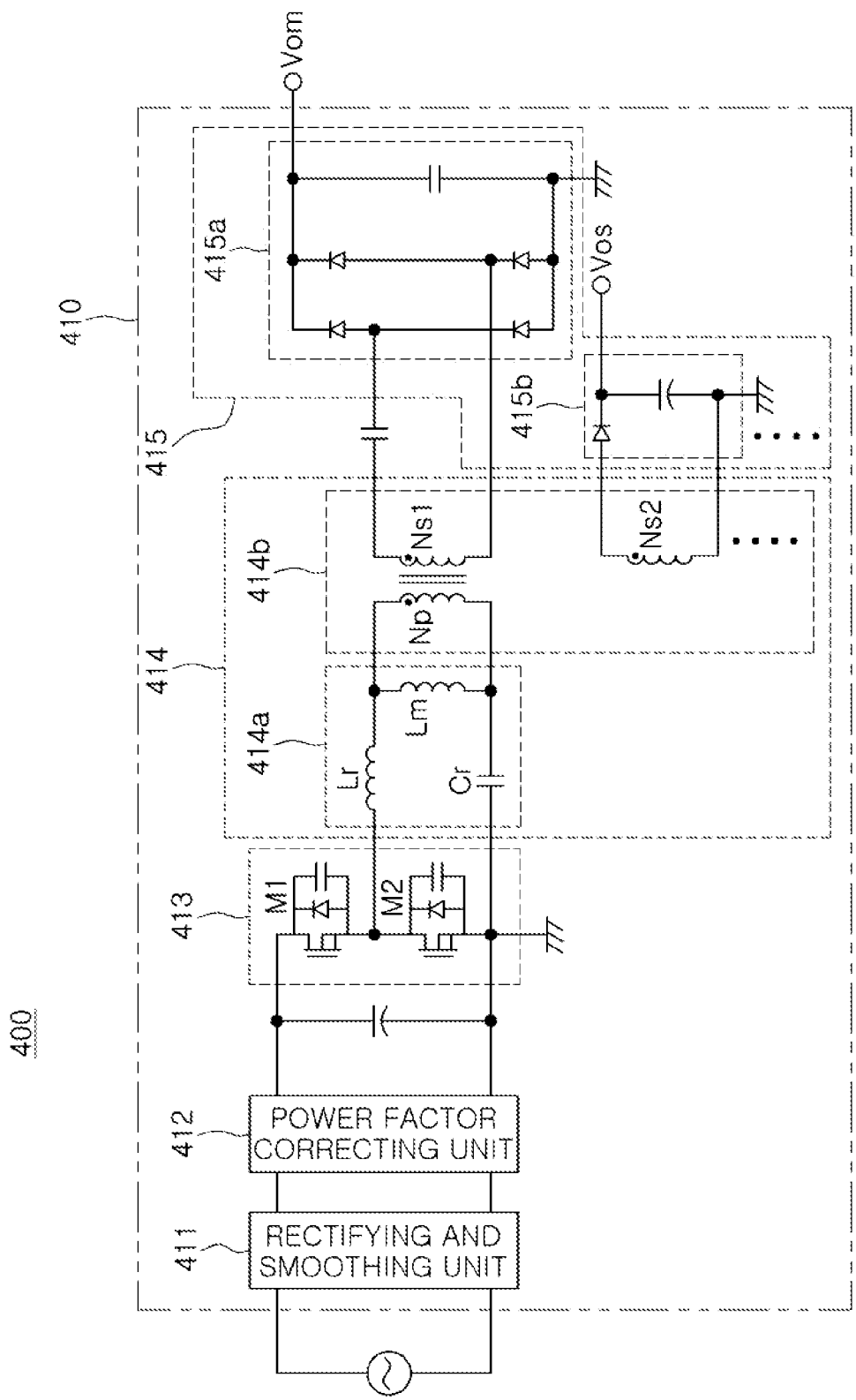
FIG. 34 is a circuit diagram of a power supply device of a flat panel display unit employing a transformer according to an exemplary embodiment of the present inventive concept.

FIG. 34 is a circuit diagram of a power supply device of a flat panel display unit employing a transformer according to an exemplary embodiment of the present inventive concept.

Specifically, FIG. 34 is a circuit diagram of a power supply device 400 applied to a flat panel display device employing the transformer TF according to an exemplary embodiment of the present inventive concept.

A power supply unit 410 may include a switching unit 413, a transforming unit 414, and an output unit 415, and may further include a rectifying and smoothing unit 411, and a power factor correcting unit 412.

The rectifying and smoothing unit 411 may rectify and smooth AC power and deliver the same to the power factor correcting unit 412. The power factor correcting unit 412 may correct a power factor by adjusting a phase difference between a voltage and a current, or may also correct a power factor by adjusting a current waveform of rectified power to follow a voltage waveform.

The switching unit 413 may include at least two switches M1 and M2 stacked between an input power terminal to which DC power is inputted from the power factor correcting unit 415 and a ground, and may perform a power conversion operation according to an alternative switching operation of the first switch M1 and the second switch M2.

The transforming unit 414 may include a resonant tank 414a and a transformer 414b. The resonant tank 414a may provide inductor-inductor-capacitor (Lr, Lm, Cr, LLC) resonating operation, and one (Lm) of the inductors may be a magnetizing inductor.

The transformer 414b may include a primary winding Np and a plurality of secondary windings Ns1 and Ns2. The primary winding Np and the plurality of secondary windings Ns1 and Ns2 may be electrically insulated from one another. For example, the primary winding Np may be positioned in a primary side in which electrical properties of grounds are different, and the plurality of secondary windings Ns1 and Ns2 may be positioned in a secondary side.

The primary winding Np and the secondary windings Ns1 and Ns2 may be formed to have a pre-set winding ratio, and the secondary windings Ns1 and Ns2 may vary a voltage level according to the winding ratio to output power.

The output unit 415 may stabilize power from the plurality of secondary windings Ns1 and Ns2 to output a plurality of DC power Vom and Vos. The output unit 415 may include a plurality of output units 415a and 415b corresponding to the plurality of secondary windings Ns1 and Ns2.

For example, when the plurality of secondary windings Ns1 and NS2 are a first secondary winding ns1 and a second secondary winding Ns2, the output unit 415 may include a first output unit 415a and a second output unit 415b.

The first output unit 415a may rectify and stabilize first power Vom from the first secondary winding Ns1 and output the same, and the second output unit 415b may rectify and stabilize second power Vos from the second secondary winding Ns2 and output the same.

As set forth above, in the case of the transformer and the power supply device including the same according to exemplary embodiments of the present inventive concept, a sufficient creepage distance may be secured between the first coil unit and the second coil unit.

Also, since a complicate manufacturing process is eliminated, such as eliminating a bobbin structure, or the like, a size and manufacturing costs of the transformer may be reduced.

While exemplary embodiments have been shown and described above, it will be apparent to those skilled in the art that modifications and variations could be made without departing from the spirit and scope of the present disclosure as defined by the appended claims.

What is claimed is:

1. A transformer, comprising:
   a magnetic core;
   a first coil unit disposed in the magnetic core and including a laminated board having layers laminated therein and conductive patterns for forming a primary coil, the conductive patterns being disposed on the laminated layers;
   a second coil unit including a conductive wire for forming a secondary coil spaced apart from the conductive patterns of the laminated board by an insulating distance; and
   a based disposed on a main board,
   wherein the base includes a plurality of terminal pins electrically connecting the laminated board and the main board
   wherein the laminated board includes a first layer on which a conductive pattern is disposed, a second layer on which a shielding pattern is disposed, and a third layer on which a Vcc pattern for forming an induction current is disposed,
   wherein the conductive pattern, the shielding pattern, and the Vcc pattern of the laminated board are disposed around a through hole allowing a middle leg of the magnetic core to be inserted thereinto,
   wherein the conductive pattern be laminated to form an inductor pattern having a coil shape, and
   wherein the base includes an accommodation portion comprising a seating part having the coil unit seated therein and a side wall protruding from the seating part, wherein the side wall of the accommodation portion has a coil outlet as a passage through which the second coil unit is led out to an external surface of the accommodation portion.

2. The transformer of claim 1, wherein the first coil comprises a connector to electrically connect an external board and a stoppage protrusion,
   wherein the stoppage protrusion is disposed between a side wall of the magnetic core and the connector disposed to correspond to the side wall of the magnetic core and prevents insertion of the connector in a direction of the middle leg.

3. The transformer of claim 1, further comprising a spacer disposed between an inner surface of the magnetic core and the first coil unit, wherein the spacer includes a conductive material.

4. The transformer of claim 1, wherein the transformer further comprises a first terminal portion and a second terminal portion, and the second terminal portion includes a terminal strip supporting the second coil unit led out from the accommodation portion and a fastening recess to which an end of the second coil unit is fastened.

5. The transformer of claim 1, further comprising a spacer disposed between an inner surface of the magnetic core and the first coil unit, wherein the spacer includes a buffering material formed of rubber.

6. The transformer of claim 1, wherein the second coil unit has a thickness less than that of the first coil unit.

* * * * *